United States Patent
Ebisumoto

(10) Patent No.: US 11,320,005 B2
(45) Date of Patent: May 3, 2022

(54) FRICTION ENGAGEMENT ELEMENT CONTROL SYSTEM AND METHOD OF CONTROLLING FRICTION ENGAGEMENT ELEMENT

(71) Applicant: Mazda Motor Corporation, Hiroshima (JP)

(72) Inventor: Hirofumi Ebisumoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/154,196

(22) Filed: Jan. 21, 2021

(65) Prior Publication Data
US 2021/0285507 A1    Sep. 16, 2021

(30) Foreign Application Priority Data
Mar. 12, 2020  (JP) .............................. JP2020-042996

(51) Int. Cl.
*F16D 48/06* (2006.01)
*F16D 48/02* (2006.01)

(52) U.S. Cl.
CPC ............. *F16D 48/06* (2013.01); *F16D 48/02* (2013.01); *F16D 2048/0251* (2013.01); *F16D 2500/1026* (2013.01); *F16D 2500/1045* (2013.01); *F16D 2500/1085* (2013.01); *F16D 2500/30408* (2013.01); *F16D 2500/30415* (2013.01); *F16D 2500/30426* (2013.01); *F16D 2500/3108* (2013.01); *F16D 2500/70404* (2013.01); *F16D 2500/70668* (2013.01)

(58) Field of Classification Search
None
See application file for complete search history.

(56) References Cited

U.S. PATENT DOCUMENTS

2002/0148700 A1* 10/2002 Dominke .............. F16D 48/066
192/85.63

FOREIGN PATENT DOCUMENTS

JP          2011190864 A      9/2011

* cited by examiner

*Primary Examiner* — Timothy Hannon
(74) *Attorney, Agent, or Firm* — Alleman Hall Creasman & Tuttle LLP

(57) ABSTRACT

A friction engagement element control system is provided, which includes a friction engagement element including friction plates, and an actuation system configured to engage an input-side friction plate with an output-side friction plate with a pushing force, the friction plates having a negative slope characteristic in which a friction coefficient thereof decreases as a rotational difference between the friction plates increases, a rotational difference sensor of the friction engagement element, a separator configured to divide a variation in the detected rotational difference into a high-frequency component that is a vibration component and other low-frequency components, and a controller configured to control a pushing force only for the vibration component of the rotational difference so that the negative slope characteristic becomes a positive slope characteristic in which a frictional force of the friction engagement element decreases as the rotational difference decreases, when engaging the friction engagement element.

17 Claims, 12 Drawing Sheets

| | LOW CLUTCH (40) | HIGH CLUTCH (50) | LR BRAKE (60) | 26 BRAKE (70) | R35 BRAKE (80) |
|---|---|---|---|---|---|
| 1ST GEAR | O | | O | | |
| 2ND GEAR | O | | | O | |
| 3RD GEAR | O | | | | O |
| 4TH GEAR | O | O | | | |
| 5TH GEAR | | O | | | O |
| 6TH GEAR | | O | | O | |
| REVERSE GEAR | | | O | | O |

FRICTION ENGAGEMENT ELEMENT CONTROL SYSTEM AND METHOD OF CONTROLLING FRICTION ENGAGEMENT ELEMENT

TECHNICAL FIELD

The present disclosure relates to a friction engagement element control system mounted on a vehicle, such as an automobile.

BACKGROUND OF THE DISCLOSURE

Automatic transmissions mounted on vehicles, such as automobiles, switch a power transmission path (comprised of a planetary gear set, etc.) by selectively engaging a plurality of friction engagement elements (comprised of a clutch, a brake, etc.) to achieve a given gear stage according to the operating state of the vehicle.

Such friction engagement elements include input-side friction plates, output-side friction plates, and pushing force generation means for engaging these friction plates. As the pushing force generation means, a hydraulic piston which operates a piston by hydraulic pressure supplied from an oil pump, and an electric motor type piston provided with an electric motor configured to operate a hydraulic cylinder which supplies hydraulic pressure to a piston, are known. Moreover, as the friction engagement elements mounted on the vehicle, for example, an electromagnetic clutch for a four-wheel drive vehicle in which a pushing force is generated by an electromagnetic force without using the hydraulic pressure, is known.

When the friction engagement elements transition from a disengaged state to an engaged state, a frictional force (engaging force) between the input-side friction plates and the output-side friction plates is increased by the pushing force generation means. The friction engagement elements are fully engaged when a rotational difference between both the friction plates decreases and then becomes zero. While the friction engagement elements transition from the disengaged state to the engaged state, judder vibration (a stick-slip phenomenon) which is caused by a variation in the engaging force may occur. Since the engaging force is a product of a friction coefficient of the friction material and the pushing force, the judder vibration occurs due to a change in a friction coefficient of the friction engagement elements, a variation in hydraulic pressure, etc.

When the friction coefficient as the cause of the judder vibration is considered, a friction coefficient $\mu$ of the friction engagement elements has such a characteristic that it varies according to a change in a rotational difference V between the friction engagement elements. In more detail, the friction plates used for the friction engagement elements generally have a positive-slope characteristic in which the friction coefficient $\mu$ decreases with the decrease of the rotational difference V and the friction coefficient $\mu$ increases with the increase of the rotational difference V (a $\mu$-V characteristic has a positive slope), or a negative-slope characteristic in which the friction coefficient $\mu$ decreases with the increase of the rotational difference V (the $\mu$-V characteristic has a negative slope).

JP2011-190864A discloses a friction material having the positive-slope characteristic which is generally used as the friction material for the friction engagement elements.

As illustrated in FIG. 12, the change in the friction coefficient $\mu$ relative to the rotational difference V when the friction engagement element having the positive-slope characteristic transitions from the disengaged state to the engaged state is described. A starting point P1 of the transition indicates a point where the characteristic friction coefficient relative to a rotational difference N1 at a transition start timing t1, is $\mu$1. Further, in order to facilitate an easier understanding, the rotational difference at t1+$\Delta$t after a minute time $\Delta$t from the transition start timing t1 in a case where the slope of the $\mu$-V characteristic is zero (the $\mu$-V characteristic is the zero slope) is first estimated, and it is set as N2. Since the $\mu$-V characteristic is the zero slope, the friction coefficient relative to the rotational difference N2 at t1+$\Delta$t becomes $\mu$1, as illustrated at P2. Here, considering the case where the $\mu$-V characteristic is the positive slope, the friction coefficient $\mu$ becomes $\mu$2 which is smaller than $\mu$1, at the rotational difference N2.

Therefore, since the total of the frictional forces which brakes the rotational difference during $\Delta$t becomes smaller than the case where the $\mu$-V characteristic is the zero slope when the $\mu$-V slope is positive, the rotational difference at t1+$\Delta$t becomes N3 which is slightly higher than N2, and the friction coefficient $\mu$ at that time becomes $\mu$3 which is slightly higher than $\mu$2 (P3). Here, since it is certain that N3 is somewhere between N1 and N2, the rotational difference at t1+$\Delta$t can be determined uniquely and stably. Thus, the transitions of the rotational difference V and the friction coefficient $\mu$ relative to the time when the $\mu$-V characteristic is the positive slope are determined, and it stably reaches a full engagement (rotational difference=0) by repeating this operation.

Meanwhile, in order to improve fuel efficiency, a reduction of drive energy of the pushing force generation means (e.g., the load of the engine which drives a mechanical oil pump) is demanded. As described above, since the engaging force is a product of the friction coefficient and the pushing force, the friction coefficient may be increased in order to reduce the hydraulic pressure while securing a transmission torque capacity.

However, generally, when the friction coefficient $\mu$ of the friction plates is increased, the $\mu$-V characteristic turns into the negative slope from the positive slope as illustrated in FIG. 13. This change in the friction coefficient $\mu$ relative to the rotational difference V when the friction engagement elements having the $\mu$-V characteristic of the negative slope transitions from the disengaged state to the engaged state is described. Here, a starting point P11 of the transition indicates a point at which the friction coefficient of the characteristic relative to the rotational difference N11 at a transition start timing t11, is $\mu$11. Then, similarly to the case of the $\mu$-V characteristic being the positive slope, the rotational difference V at t11+$\Delta$t when the $\mu$-V characteristic has the zero slope is first considered, and it is set as N12.

Here, when the case where the $\mu$-V characteristic has the negative slope is considered, the friction coefficient $\mu$ at the rotational difference N12 is $\mu$12, and it is larger than $\mu$11. Therefore, since the total of the frictional forces which brakes the rotation becomes larger during $\Delta$t when the $\mu$-V characteristic has the negative slope than when the $\mu$-V characteristic has the zero slope, the rotational difference P12 at the t11+$\Delta$t becomes slightly lower than N12 (N13).

Thus, considering the total of the frictional forces which brakes the rotational difference during $\Delta$t while the rotational difference at t11+$\Delta$t is now set as N13, since the total of frictional forces becomes further larger than the case where it changes from N11 to N13, the rotational difference at t11+$\Delta$t becomes further lower than N13. Thus, when the $\mu$-V characteristic is the negative slope, a rapid, instant decrease in the rotational difference occurs due to the decrease in the rotational difference and the increase in the friction coefficient μ forming a positive feedback arrangement and amplifying each other.

This rapid decrease in the rotational difference V causes torsion (elastic deformation) in metal shafts connected to both ends of the friction engagement elements, and the friction engagement elements slip suddenly at the moment (P14) that an elastic force accumulated in the metal shafts by the torsion exceeds the transmission torque capacity which is transmittable by the friction engagement elements. That is, the rotational difference of the friction engagement elements increases rapidly as illustrated by a white arrow, and the metal shafts return to the original state where there is no torsion. From this state, the rotational difference again begins the rapid decrease similar to the above, and the judder vibration occurs by repeating this procedure.

SUMMARY OF THE DISCLOSURE

Therefore, the present disclosure is made in view of the problem described above, and one purpose thereof is to provide a friction engagement element control system, which can achieve both an improvement in fuel efficiency by a reduction of a pushing force of friction engagement elements, and a reduction of judder vibration.

The present inventors examined various aspects about a reduction of the judder vibration when the friction engagement elements using friction plates with a high friction coefficient having the μ-V characteristic of the negative slope are engaged. As described above, it is conventionally known about whether the judder vibration occurs or not according to the μ-V characteristic being the positive slope or the negative slope. The present inventors discovered that, even if the μ-V characteristic has the negative slope, the occurrence of the judder vibration can be suppressed by turning a characteristic formula (hereinafter, referred to as the "F-V characteristic formula") into the positive slope. Here, the F-V characteristic formula indicates a relationship between the frictional force F and the rotational difference V of the friction engagement elements, which can be obtained by multiplying the friction coefficient μ of the μ-V characteristic formula by the pushing force P for engaging the friction engagement elements. That is, the present inventors reached the consideration of making the F-V characteristic formula into the positive slope by controlling the pushing force and the present disclosure is based on this consideration.

According to one aspect of the present disclosure, a friction engagement element control system is provided, which includes a friction engagement element including friction plates, which are an input-side friction plate and an output-side friction plate, and an actuation system configured to engage the input-side friction plate with the output-side friction plate with a pushing force, the friction plates having a negative slope characteristic in which a friction coefficient thereof decreases as a rotational difference between the friction plates increases, a rotational difference sensor configured to detect the rotational difference of the friction engagement element, a filter configured to divide a variation in the rotational difference detected by the rotational difference sensor into a high-frequency component that is a vibration component and other low-frequency components, and a controller configured to control the pushing force of the friction engagement element only for the vibration component of the rotational difference so that the negative slope characteristic becomes a positive slope characteristic in which a frictional force of the friction engagement element decreases as the rotational difference decreases, when engaging the friction engagement element.

According to this configuration, by using the friction plates with the high friction coefficient having the μ-V characteristic of the negative slope in which the friction coefficient μ decreases as the rotational difference V increases, the pushing force of the friction engagement element can be reduced. Therefore, the drive energy for driving the actuation system can be reduced, thereby improving fuel efficiency and downsizing drive sources.

Since the controller controls the pushing force of the friction engagement element so as to have the positive-slope characteristic in which the frictional force decreases as the rotational difference of the high-frequency component that is a vibration component among variations of the rotational difference of the friction engagement element decreases when engaging the friction engagement element, the judder vibration can be suppressed even when the friction material of which the μ-V characteristic of the friction coefficient is the negative slope is used.

As described above, in the friction engagement element control system, both the improvement in fuel efficiency by the reduction of the pushing force of the friction engagement element and the reduction of judder vibration can be achieved.

Particularly according to this configuration, since the control is performed so that the characteristic becomes the positive slope in which the frictional force decreases as the rotational difference of the high-frequency component that is the vibration component among the variations of the rotational difference of the friction engagement element decreases, the control range of the pushing force can be reduced. In detail, during the engagement, the control range of the pushing force can be reduced, as compared with the case where the pushing force is controlled so that it becomes the F-V characteristic of the positive slope in which the frictional force decreases as the rotational difference of each friction engagement element (the rotational difference including the high-frequency component that is the vibration component, and other low-frequency components) decreases. Therefore, the controllability when engaging the friction engagement element improves. Moreover, since the pushing force at the high rotational difference side where the rotational difference is large can be reduced, fuel efficiency can be improved.

The actuation system may include a piston, an oil pump, and a control valve configured to control hydraulic pressure supplied to the piston from the oil pump.

According to this configuration, for example, when the friction engagement element control system is used for an automatic transmission, both the improvement in fuel efficiency by the reduction of the pushing force of the friction engagement element and the reduction of judder vibration can be achieved, without changing the conventional configuration of the friction engagement element provided with a control valve which controls the hydraulic pressure supplied to the piston from the oil pump.

Meanwhile, since the frequency of the judder vibration is generally in the order of tens of hertz, in order to reduce judder vibration, the speed of response of the actuation system is required to be higher than the frequency of the judder vibration. That is, a period of time after the actuation system receives a given hydraulic pressure supply command from the controller until the hydraulic pressure is controlled to reach a given value and the piston presses the friction plates, is required to be shortened.

In this regard, the actuation system may include a piston, a hydraulic cylinder configured to supply hydraulic pressure to the piston, and an electric motor configured to operate the hydraulic cylinder.

According to this configuration in which the hydraulic cylinder configured to supply the hydraulic pressure to the piston is operated by the electric motor, the speed of response of the friction engagement element can be improved as compared with the conventional configuration of the friction engagement element provided with a control valve which controls the hydraulic pressure supplied to the piston from an oil pump. Therefore, the engagement and disengagement of the frictional engagement element can be controlled at a higher speed of response than the frequency of the judder vibration, for example, with the speed of response as about 100 Hz or higher, and the judder vibration may be suppressed more effectively.

The friction engagement element control system may constitute an automatic transmission. The automatic transmission may include an input member coupled to the input-side friction plate, an output member coupled to the output-side friction plate, an input rotating speed sensor configured to detect a rotating speed of the input member, and an output rotating speed sensor configured to detect a rotating speed of the output member. The controller may calculate the rotational difference by converting the input rotating speed detected by the input rotating speed sensor and the output rotating speed detected by the output rotating speed sensor.

According to this configuration, the rotational difference of the friction engagement element is calculated based on the rotating speeds of the input member of the automatic transmission and the output member of the automatic transmission, and the gear ratio of the friction engagement element. Therefore, it is not necessary, for obtaining the rotational difference, to be provided with a sensor for detecting a rotating speed of each of the input-side friction plate and the output-side friction plate of each friction engagement element (or rotating members with which both the friction plates engage).

The controller may correct the pushing force according to the rotational difference.

According to this configuration, since the controller corrects the pushing force for controlling the engaging force (frictional force) according to the rotational difference, it can control the engaging force (frictional force) relative to the rotational difference so as to become the positive slope.

The controller may control the pushing force from a start of the engagement of the friction engagement element to an end of the engagement.

According to this configuration, since the controller performs the control during the period from the engagement start of the friction engagement element to the end of engagement, the judder vibration during the transition from the disengaged state to the engaged state can be suppressed effectively.

The filter may separate the high-frequency component from the other low-frequency components according to a frequency of the variation in the rotational difference.

According to this configuration, the high-frequency component that is the vibration component and other low-frequency components can be divided with the simple configuration using the filter, such as a high-pass filter or a low-pass filter.

According to one aspect of the present disclosure, a method of controlling a friction engagement element is provided, the friction engagement element including friction plates, which are an input-side friction plate and an output-side friction plate, and an actuation system configured to engage the input-side friction plate with the output-side friction plate with a pushing force, the friction plates having a negative slope characteristic in which a friction coefficient thereof decreases as a rotational difference between the friction plates increases. The method includes detecting the rotational difference of the friction engagement element, dividing a variation in the detected rotational difference into a high-frequency component that is a vibration component and other low-frequency components, and controlling a pushing force of the friction engagement element only for the vibration component of the rotational difference so that the negative slope characteristic becomes a positive slope characteristic in which a frictional force of the friction engagement element decreases as the rotational difference decreases, when engaging the friction engagement element.

Also according to this configuration, the effect described above can be achieved.

BRIEF DESCRIPTION OF DRAWINGS

FIG. 5A illustrates a graph of the frictional force relative to the rotational difference, and FIG. 5B illustrates a graph of the pushing force relative to the rotational difference.

FIG. 6A illustrates a graph of the frictional force relative to the rotational difference, and FIG. 6B illustrates a graph of the frictional force relative to the rotational difference.

DETAILED DESCRIPTION OF THE DISCLOSURE

Hereinafter, one embodiment in which the present disclosure is applied to an automatic transmission is described with reference to the accompanying drawings.

Figures 1, 2:
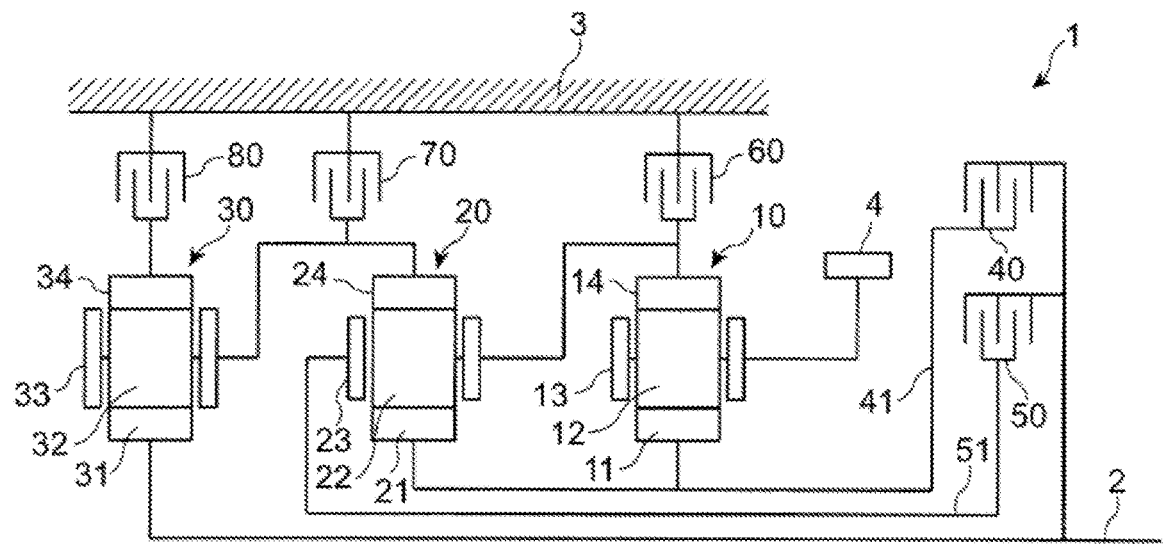
FIG. 1 is a view schematically illustrating an automatic transmission provided with a friction engagement element control system according to one embodiment of the present disclosure.
FIG. 2 is an engagement table illustrating a relationship between a combination of engagement of the friction engagement elements and a gear stage of this automatic transmission.

FIG. 1 is a view schematically illustrating a configuration of the automatic transmission as a friction engagement element control system according to this embodiment of the present disclosure. This automatic transmission 1 has an input shaft 2 as an input member of the automatic transmission 1 into which engine output is inputted through a torque converter (not illustrated). On this input shaft 2, first, second, and third planetary gear sets (hereinafter, referred to as the "first, second, and third gear sets") 10, 20, and 30 are disposed from the drive-source side (right side in this drawing).

On the input shaft 2, as friction engagement elements for switching a power transmission path comprised of the first to third gear sets 10, 20, and 30, a low clutch 40 and a high clutch 50 which selectively transmit power from the input shaft 2 to the gear sets 10, 20, and 30 side, an LR (low reverse) brake 60, a 26 brake 70, and an R35 brake 80 which fix given rotating elements of the gear sets 10, 20, and 30 are disposed in this order from the drive-source side. The first, second, and third gear sets 10, 20, and 30 are comprised of sun gears 11, 21, and 31, a plurality of pinions 12, 22, and 32 which mesh with the sun gears 11, 21, and 31, carriers 13, 23, and 33 which support the pinions 12, 22, and 32, and ring gears 14, 24, and 34 which mesh with the pinions 12, 22, and 32, respectively.

Further, the sun gear 11 of the first gear set 10 and the sun gear 21 of the second gear set 20 are combined, and they are coupled to an inner rotating member 41 of the low clutch 40. Moreover, an inner rotating member 51 of the high clutch 50 is coupled to the carrier 23 of the second gear set 20. Moreover, the input shaft 2 is directly coupled to the sun gear 31 of the third gear set 30.

Moreover, the ring gear 14 of the first gear set 10 and the carrier 23 of the second gear set 20 are combined, and the LR brake 60 is disposed between these and a transmission case 3. Moreover, the ring gear 24 of the second gear set 20 and the carrier 33 of the third gear set 30 are combined, the 26 brake 70 is disposed between these components and the transmission case 3, and the R35 brake 80 is disposed between the ring gear 34 of the third gear set 30 and the transmission case 3. An output gear 4 as an output member of the automatic transmission 1 which outputs the output of the automatic transmission 1 to the driving-wheel (not illustrated) side is coupled to the carrier 13 of the first gear set 10.

By the above configuration, this automatic transmission 1 selectively uses the combination of the engaged state of the low clutch 40, the high clutch 50, the LR brake 60, the 26 brake 70, and the R35 brake 80 to form first to sixth gears in a D-range and a reverse gear in an R-range, as illustrated in FIG. 2.

Each of the friction engagement elements 40, 50, 60, 70, and 80 includes a plurality of inner friction plates disposed inside, outer friction plates disposed outside the plurality of inner friction plates, a piston which engages the plurality of friction plates, and an engagement hydraulic pressure chamber to which engagement hydraulic pressure for pressing the piston to the friction-plates side is supplied. One of the inner friction plate(s) and the outer friction plate(s) becomes an input-side friction plate and the other becomes an output-side friction plate, according to a power transmission state.

Figure 3:
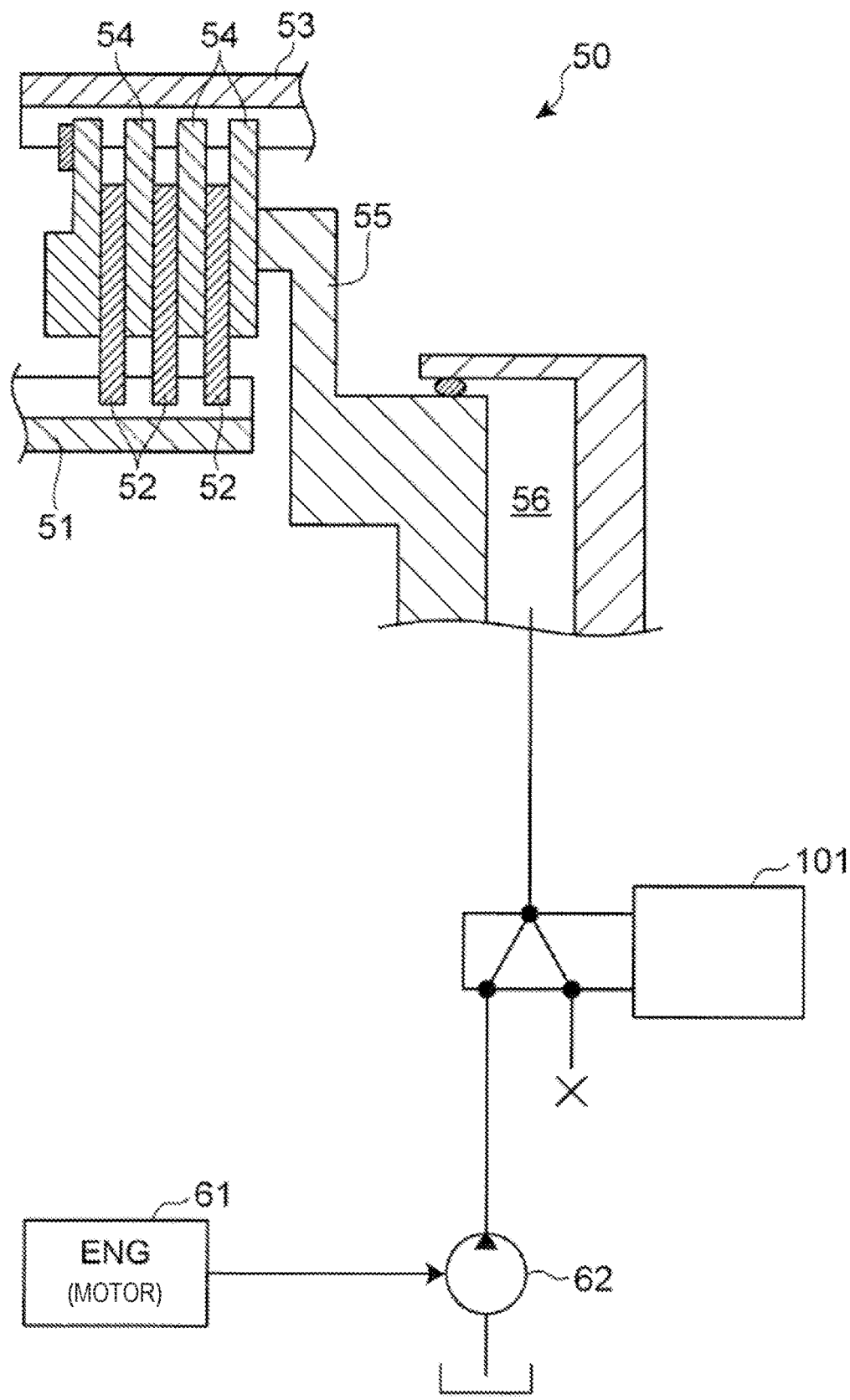
FIG. 3 is a circuit diagram illustrating a part of a hydraulic circuit of this automatic transmission.

Here, the high clutch 50 is described with reference in FIG. 3, as one example of a part of a hydraulic circuit 100 which controls the engagement/disengagement of the friction engagement elements 40, 50, 60, 70, and 80.

The high clutch 50 includes at least one inner friction plate 52 which is engaged with an outer circumferential surface of a cylindrical part of the inner rotating member 51, at least one outer friction plate 54 which is engaged with an outer circumferential surface of a cylindrical part of an outer rotating member 53, and a piston 55 which presses the inner friction plate(s) 52 and the outer friction plate(s) 54.

The inner friction plate 52 and the outer friction plate 54 are disposed alternately in the axial direction. The piston 55 is disposed so as to be rotatable on the axial center of the input shaft 2 and slidable in the axial direction. The piston 55 slides in the axial direction to press the inner friction plate 52 and the outer friction plate 54 in the axial direction so that the plates are engaged with each other. The slide of the piston 55 is controlled by feeding and discharging hydraulic fluid to/from an engagement hydraulic pressure chamber 56.

A solenoid valve 101 is connected to the engagement hydraulic pressure chamber 56 as a control valve which constitutes a part of the hydraulic circuit 100 for controlling feeding and discharging of hydraulic fluid to/from the engagement hydraulic pressure chamber 56. A line hydraulic pressure which is adjusted to an engagement hydraulic pressure according to a command signal from a control device 200 described later (see FIG. 4) is supplied to the hydraulic pressure chamber 56 through the solenoid valve 101. The line pressure is obtained by adjusting the hydraulic pressure (original hydraulic pressure) generated by a mechanical oil pump 62 which is rotated by an engine 61 to the pressure according to the accelerator opening, the engine load, etc. Note that although the oil pump 62 (mechanical pump) is driven by the engine as a drive source, the oil pump may be driven by a motor (i.e., an electric pump). Moreover, the piston 55, the oil pump 62, and the solenoid valve 101 which controls the hydraulic pressure supplied from the oil pump 62 to the piston 55 constitute one example of an "actuation system" in the present disclosure.

Figure 4:
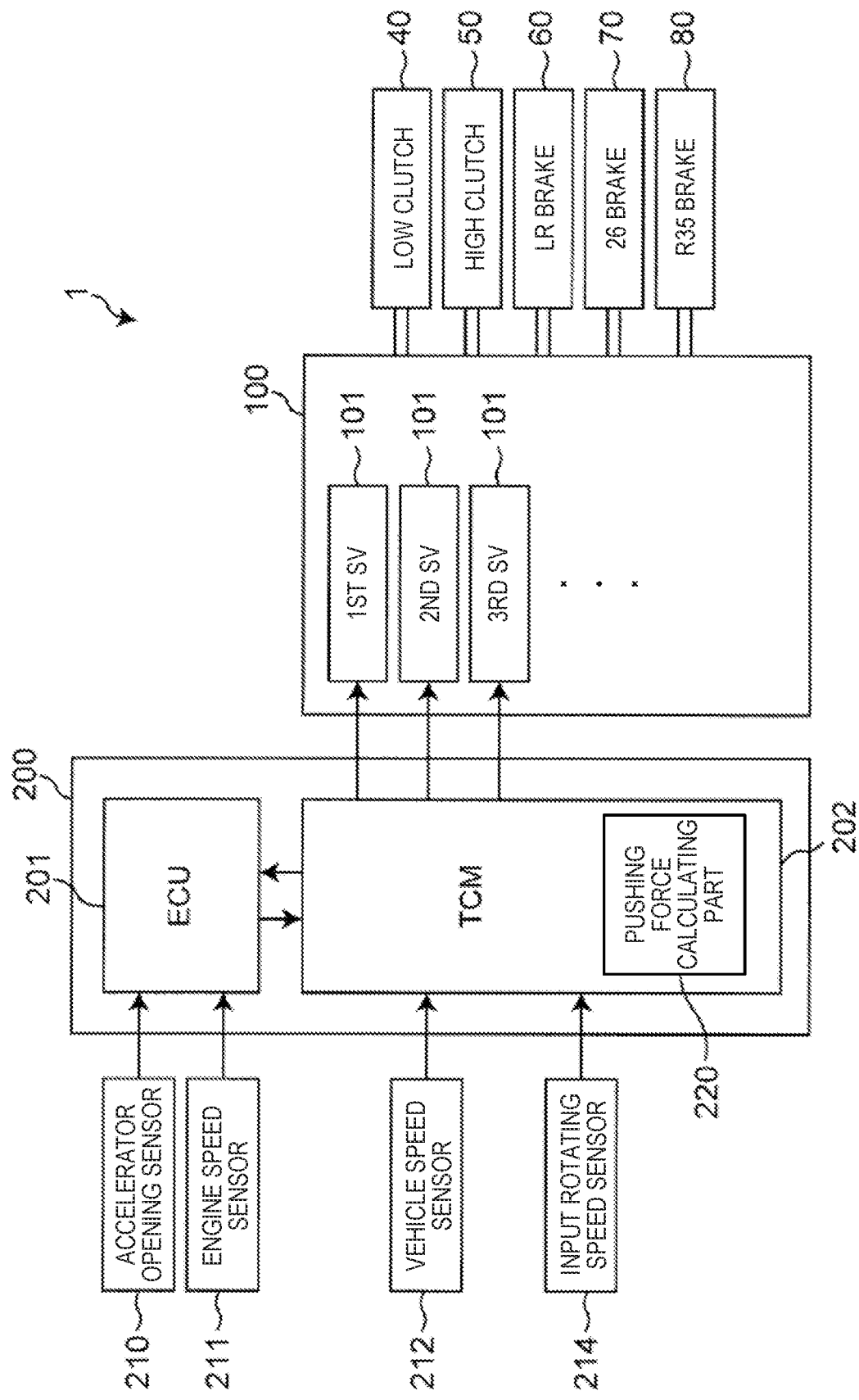
FIG. 4 is a diagram illustrating a control system of this automatic transmission.

As illustrated in FIG. 4, the automatic transmission 1 is provided with the hydraulic circuit 100 for selectively supplying the engagement line pressure to the friction engagement elements 40, 50, 60, 70, and 80 to achieve the gear stages as described above. This hydraulic circuit 100 is provided with a plurality of solenoid valves 101 for a transmission control (hereinafter, the "solenoid valve" may be referred to as "SV").

The plurality of solenoid valves 101 of the hydraulic circuit 100 are controlled by the control device 200. The control device 200 includes an ECU (Engine Control Unit) 201 mounted on the engine, and a TCM (Transmission Control Unit) 202 mounted on the automatic transmission 1. The ECU 201 and the TCM 202 are electrically connected to each other, for example, through CANBUS communication.

Signals from an accelerator opening sensor 210 which detects a stepping amount of an accelerator pedal (accelerator opening) as a demanded acceleration amount to the vehicle, and an engine speed sensor 211 which detects an engine speed are inputted into the ECU 201. The ECU 201 performs various controls relevant to operation of the engine, such as a control of the output torque of the engine based on the input signals.

A signal from a vehicle speed sensor 212 which detects a traveling speed of the vehicle, a signal from an input-shaft rotating speed sensor 214 to the transmission, and a signal from a vehicle speed sensor 212 as an output-shaft rotating speed sensor are inputted into the TCM 202. Moreover, a signal from the accelerator opening sensor 210 and a signal from the engine speed sensor 211 are inputted into the TCM 202 via the ECU 201.

Based on these input signals, the TCM 202 outputs a signal to each solenoid valve 101 of the hydraulic circuit 100. Thus, the transmission control of the automatic transmission 1 is performed by controlling opening/closing or the opening of each solenoid valve 101 according to the selected range and the traveling state of the vehicle, and controlling the hydraulic pressure supply to each of the friction engagement elements 40, 50, 60, 70, and 80. Moreover, the TCM 202 outputs, to the ECU 201, various command signals relevant to the engine operation, such as the engine output torque, corresponding to the situation of the transmission control. Note that other signals from various instruments, such as an oil temperature sensor which detects temperature of hydraulic fluid may be inputted into the ECU 201.

For the transmission control, a so-called "transmission chart" using the vehicle speed and the accelerator opening as parameters, which defines conditions of a gear change for each transmission pattern (upshift conditions and downshift conditions). When the vehicle speed detected by the vehicle speed sensor 212 and the accelerator opening detected by the accelerator opening sensor 210 satisfy the gear-change condition, an upshift or a downshift is performed.

A control for hydraulic pressure supplied to the engagement hydraulic pressure chamber of the automatic transmission 1 is performed by a pushing force control (described below). The control of the hydraulic pressure supplied to the engagement hydraulic pressure chamber is performed by controlling the flow and the hydraulic pressure of hydraulic fluid supplied to the hydraulic circuit 100 from the oil pump 62 (see FIG. 3) by using a hydraulic control valve, a directional control valve, etc. which are provided to the hydraulic circuit 100.

Thus, each of the friction engagement elements 40, 50, 60, 70, and 80 is engaged when the hydraulic fluid is supplied to the engagement hydraulic pressure chamber of the friction engagement element, and is disengaged when the hydraulic fluid is discharged from the engagement hydraulic pressure chamber. Moreover, by controlling the hydraulic pressure of the engagement hydraulic pressure chamber of each of the friction engagement elements 40, 50, 60, 70, and 80, the engagement, disengagement, the slip, and a degree of the engagement (engagement ratio) in the slip condition of the friction engagement element are controlled.

The TCM 202 is further provided with a pushing force calculating part 220 which calculates the pushing force (hydraulic pressure) for a pushing force control. The pushing force calculating part 220 will be described later in detail. Note that the pushing force (hydraulic pressure) is calculated based on the rotational difference inputted into the TCM 202.

Meanwhile, friction plates with high friction coefficient are used for each of the friction engagement elements 40, 50, 60, 70, and 80 in this embodiment. Therefore, each of the friction engagement elements 40, 50, 60, 70, and 80 has a so-called "μ-V characteristic of a negative slope" in which the friction coefficient μ decreases as the rotational difference V increases (see FIG. 13). In other words, a slope $\Delta\mu/\Delta V$ of $\Delta\mu$ which is an amount of change in the friction coefficient μ of each of the friction engagement elements 40, 50, 60, 70, and 80 relative to an amount of change $\Delta V$ in the rotational differential speed V has a relationship of $\Delta\mu/\Delta V<0$. The rotational difference V (rpm) of each of the friction engagement elements 40, 50, 60, 70, and 80 is, for example, a difference in the rotating speed between the inner rotating member 51 with which the high clutch 50 of FIG. 3 engages and the outer rotating member 53.

Figure 13:
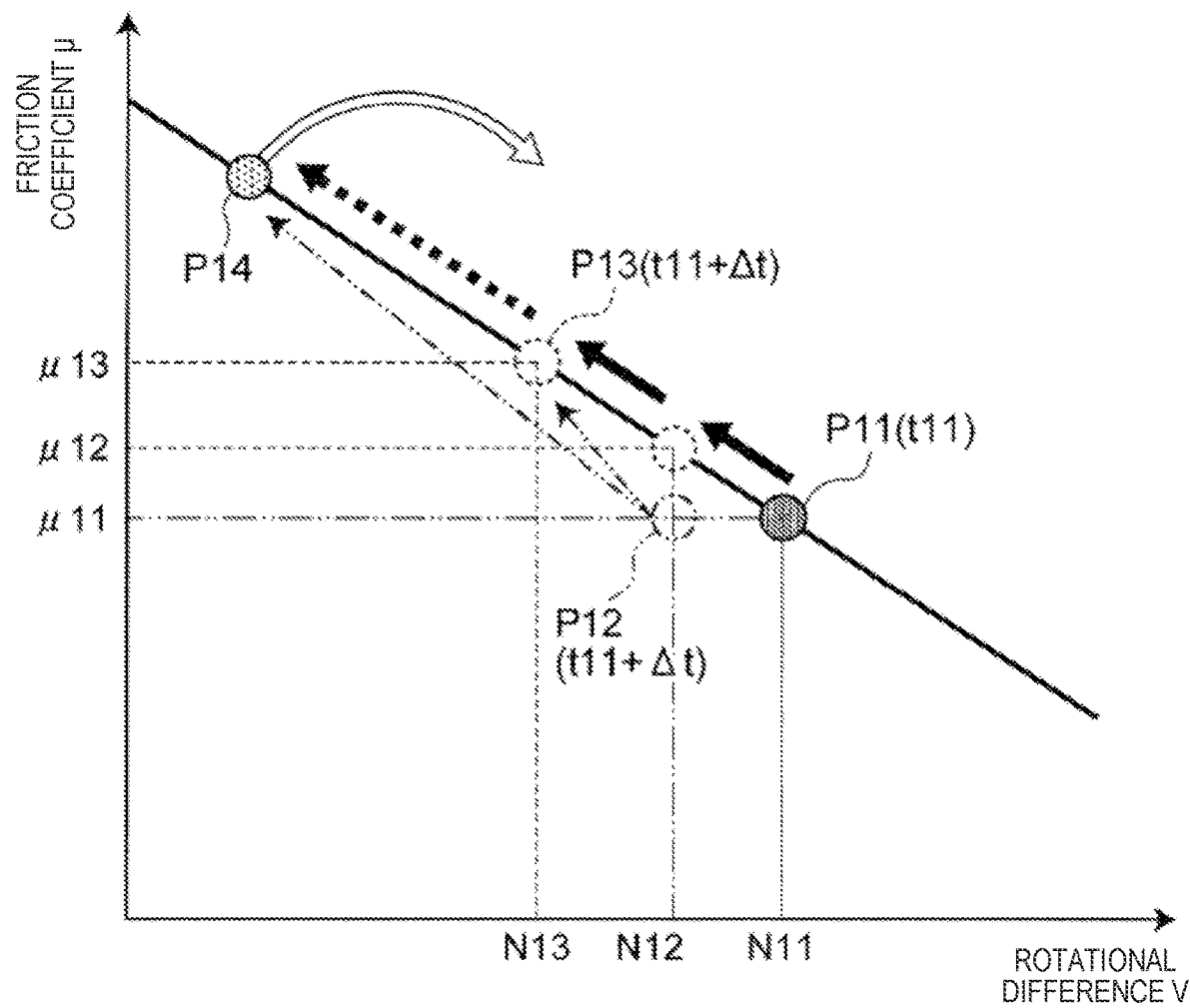
FIG. 13 is a graph of a change in the friction engagement element relative to the rotational difference when the friction engagement element of which the μ-V characteristic is a negative slope is engaged.

In the friction engagement element using the friction plates having the μ-V characteristic of the negative slope, the friction coefficient μ increases, for example, as the rotational difference V decreases from a start timing of the engagement of the high clutch 50 (see P11 in FIG. 13). Therefore, a rapid and instant decrease in the rotational difference V occurs because the decrease in the rotational difference and the increase in μ forming a positive feedback arrangement and amplify each other. This rapid decrease in the rotational difference V causes a twist or torsion (elastic deformation) in the outer rotating member 53 and the inner rotating member 51 with which the outer friction plate 54 and the inner friction plate 52 engage, respectively, and the metal shaft connected to these members (see FIG. 3). At a moment when the elastic force accumulated in the metal parts by the torsion exceeds a transmission torque capacity which is transmittable by the high clutch 50 (see P14 in FIG. 13), the high clutch 50 slips suddenly. That is, the rotational difference of the high clutch 50 increases rapidly (see the white arrow in FIG. 13), and the metal shaft, etc. return to their original states where there is no torsion. By repeating this operation, the judder vibration may occur during the engagement of the high clutch 50 (when transiting from the disengaged state to the engaged state).

As described above, since a μ-V characteristic formula μr of each friction engagement element in this embodiment is the negative slope, the judder vibration may occur when the friction engagement element is engaged with an engagement pushing force P0. Here, a characteristic formula (hereinafter, may be referred to as a "F-V characteristic formula Fr") indicative of a relationship between the frictional force F which is obtained by multiplying the friction coefficient μ of the μ-V characteristic formula μr of each friction engagement element by the pushing force P0, and the rotational difference V becomes a negative slope, as illustrated by a thick line in FIG. 5A.

Figure 5A:
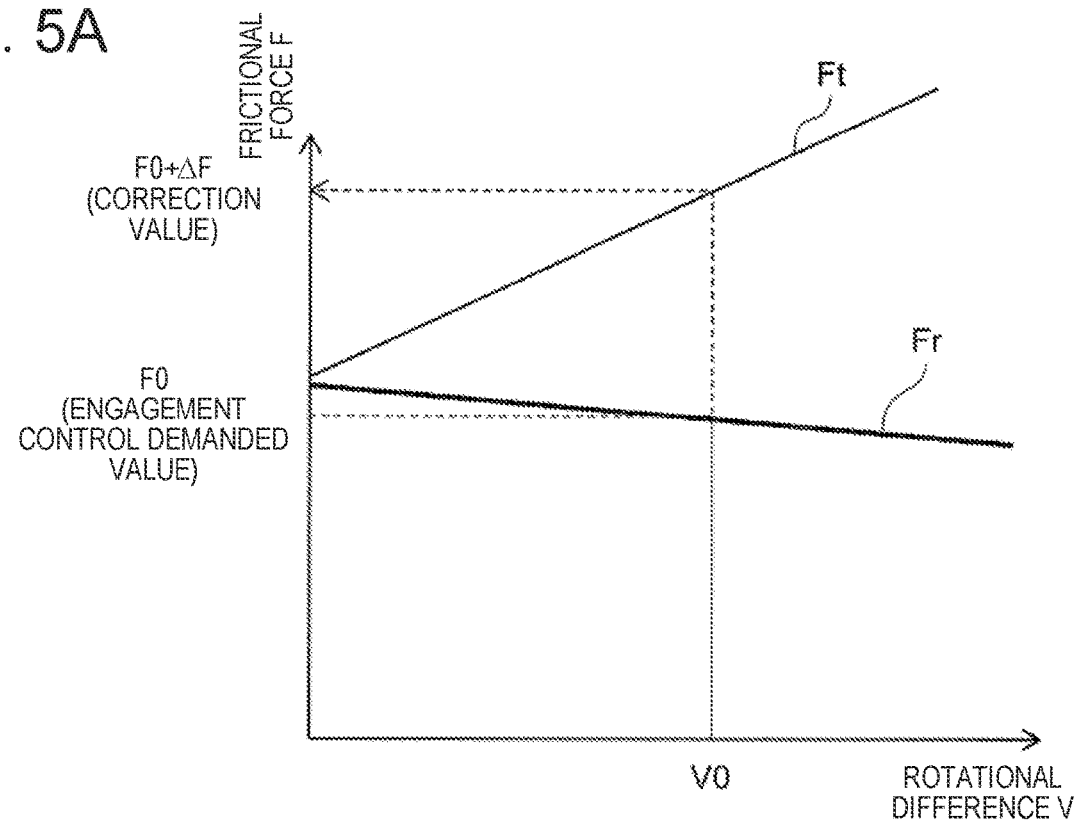
FIGS. 5A and 5B illustrate a pushing force control for correcting a F-V characteristic of the entire rotational difference to a positive slope, where

On the other hand, also when the μ-V characteristic is a negative slope, by controlling the pushing force P so that the F-V characteristic becomes the positive slope, the F-V characteristic of each friction engagement element is turned into the same characteristic as the F-V characteristic formula Ft of the positive slope in which the frictional force F decreases as the rotational difference V decreases, as illustrated by a thin line in FIG. 5A, and the judder vibration may be suppressed.

However, when turning the F-V characteristic of each friction engagement element into the same characteristic as the F-V characteristic formula Ft of the positive slope, it is necessary to set the slope of the pushing force P relative to the rotational difference V of the friction engagement element according to the slope of the μ-V characteristic formula μr of the negative slope. Therefore, depending on a degree of the negative slope of the μ-V characteristic formula μr of the friction engagement element, a control range of the pushing force P during the engagement control (a control range of the pushing force from the rotational difference V being large to the rotational difference V becoming zero (V=0)) becomes large as illustrated by a white arrow in FIG. 5B, and the controllability of the friction engagement element during the engagement may be deteriorated.

Moreover, in order to suppress the judder vibration, a correction value F0+ΔF larger than a demanded frictional force F0 required for the engagement control according to the demanded torque is generated. Corresponding to the correction value F0+ΔF of the frictional force, the pushing force P is increased by a correction value P0+ΔP (a thin line in FIG. 5B) larger than the pushing force P0 (a thick line in FIG. 5B) corresponding to the demanded frictional force F0. Since this increases the pushing force P more than needed, it is not desirable in terms of the fuel efficiency. Moreover, if the pushing force P is increased for the reduction of the judder vibration in the state where the rotational difference V is large like the rotational difference V0 at the engagement start timing, since the frictional force F increases, a shock may occur by increasing the engaging force (frictional force F) at the engagement start timing.

Figure 6A:
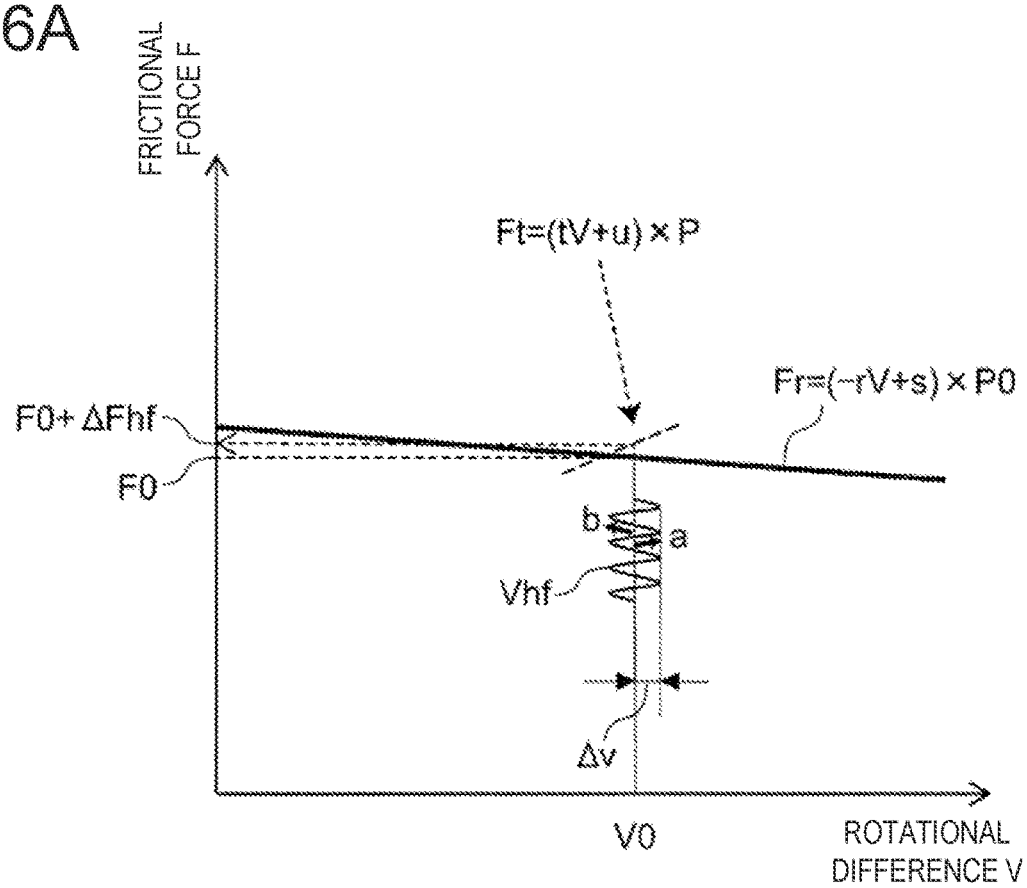
FIGS. 6A and 6B illustrate the pushing force control for correcting a F-V characteristic of a vibration component to a positive slope, where

On the other hand, as schematically illustrated in FIG. 6A, the present inventors decided that only a high-frequency component Vhf which is a vibration component due to the judder (as a concrete example, a component higher than 10 to 20 Hz which is general as the judder vibration frequency) is extracted from the rotational difference, and it is treated separately from other low-frequency components of the rotational difference (a frequency component including a variation in the rotational difference from disengagement to engagement of the friction engagement element during a gear change when there is no judder vibration). In detail, by applying the correction control of the pushing force P only to the high-frequency component Vhf so that the F-V characteristic becomes the positive slope, the occurrence of the above-described problem in other low-frequency components of the rotational difference (including the degradation in the controllability due to the increase in the control range of the pushing force P) is avoided.

In detail, a correction pushing force ΔPhf is calculated for the purpose of performing a correction of adding the correction pushing force ΔP1 corresponding to the amplitude Δv of the vibration component Vhf (in order to suppress the amplitude Δv) to the engagement pushing force P0 so that an amplitude Δv of the vibration component Vhf of FIG. 6A becomes a value corresponding to zero or substantially zero (hereinafter, may be referred to as "substantially zero").

In order to make the amplitude Δv of the vibration component Vhf substantially zero, the engagement pushing force P0 is corrected so that the frictional force F of each friction engagement element is increased to reduce the rotational difference V when the rotational difference V of the vibration component Vhf increases as illustrated by the arrow "a" of FIG. 6A, and so that the frictional force F of the friction engagement element is reduced to increase the rotational difference V when the rotational difference V of the vibration component Vhf decreases from zero as illustrated by the arrow "b" of FIG. 6A. In other words, the engagement pushing force P0 is corrected so that the F-V characteristic indicative of the relation between the rotational difference V of the vibration component Vhf and the frictional force F becomes the positive slope.

Moreover, as illustrated in FIG. 6A, a varying range (±Δv) of the rotational difference V of the vibration component Vhf is smaller than a varying range of other low-frequency components of the rotational difference (from the rotational difference V0 at the engagement start timing to the rotational difference 0 at the engagement end timing). Therefore, a correction value ΔFhf of the frictional force F for turning the F-V characteristic for the vibration component Vhf into the positive slope can be smaller than the correction value ΔF of the frictional force F of FIG. 5A.

Since the frictional force F is controlled by the pushing force P, the pushing force control is performed corresponding to the vibration component Vhf. Therefore, the control range of the pushing force can be narrowed, as compared with the case where the F-V characteristic of each friction engagement element is corrected from the negative slope (Fr) to the positive slope (Ft) as a whole as illustrated in FIG. 5A. As a result, the judder vibration of each friction engagement element having the F-V characteristic of the negative slope can be suppressed, without sacrificing the controllability. That is, by calculating the correction pushing force ΔPhf of the pushing force P for the vibration component Vhf which is small in the varying range of the rotational difference V, the control range of the pushing force P for suppressing the judder vibration can be narrowed.

Here, a configuration of the pushing force calculating part 220, and a method of calculating the pushing force is described with reference to FIGS. 7 and 8.

Figure 7:
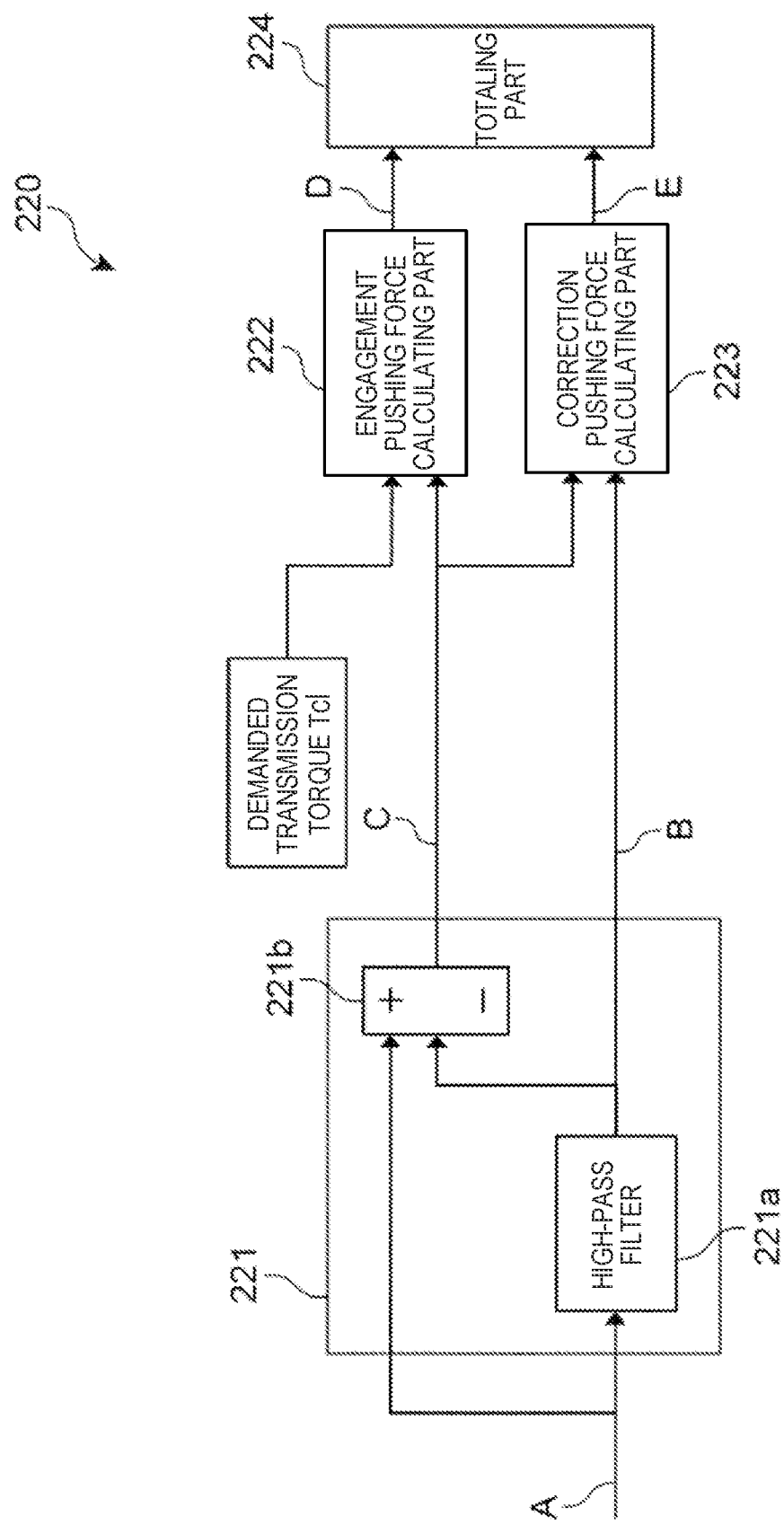
FIG. 7 is a diagram illustrating of a pushing force calculating part in this embodiment of the present disclosure.

As illustrated in FIG. 7, the pushing force calculating part 220 includes a frequency separating part 221 for separating the rotational difference Vhf at the high frequency (high-frequency component) corresponding to the vibration component from other low-frequency components, an engagement pushing force calculating part 222 which calculates the engagement pushing force P0 for the engagement control, a correction pushing force calculating part 223 which calculates the correction pushing force ΔPhf for suppressing the judder vibration, and a totaling part 224 which adds the correction pushing force ΔPhf to the engagement pushing force P0. Note that in this embodiment, a frequency higher than the judder vibration frequency (e.g., 15 Hz) is referred to as "the high frequency," and a frequency below the judder vibration frequency is "the low frequency."

Figure 8A:
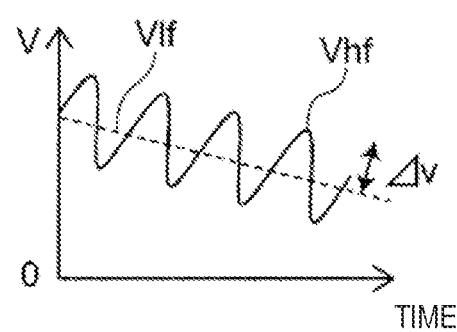
FIG. 8A is a graph of the rotational difference of the pushing force calculating part at point A.

The frequency separating part 221 includes a high-pass filter 221a and a subtracter 221b. The rotational difference V calculated based on the value from the input-shaft rotating speed sensor 214 and the output-shaft rotating speed sensor (vehicle speed sensor) 212 is inputted into the frequency separating part 221. The rotational difference V before inputted into the frequency separating part 221 (at point A of FIG. 7) contains the high-frequency component Vhf corresponding to the vibration component, and other low-frequency components Vlf, as illustrated in FIG. 8A.

Figure 8B:
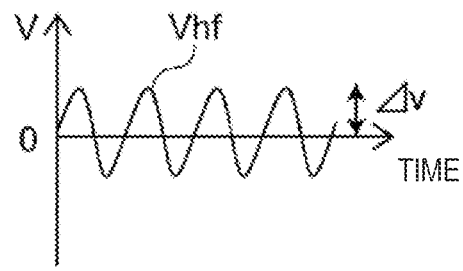
FIG. 8B is a graph of the vibration component at point B.

The rotational difference inputted into the frequency separating part 221 is inputted into the high-pass filter 221a. The high-pass filter 221a in this embodiment is comprised of a filter which passes only the high-frequency component Vhf corresponding to the vibration component higher than the frequency of the judder vibration (e.g., 10 to 20 Hz). Therefore, at point B after the high-pass filter 221a, the high-frequency component Vhf corresponding to the vibration component is obtained as illustrated in FIG. 8B.

Figure 8C:
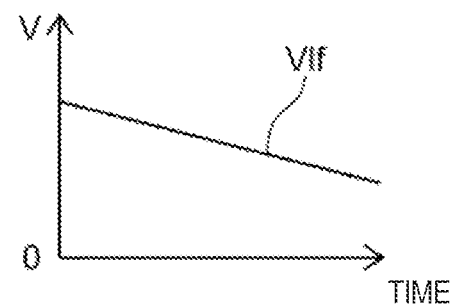
FIG. 8C is a graph of the rotational difference component at point C.

The rotational difference V and the high-frequency component Vhf which is outputted from the high-pass filter 221a are inputted into the subtracter 221b. The subtracter 221b removes the high-frequency component Vhf from the rotational difference V, and at point C after the subtracter 221b, Vlf corresponding to other low-frequency components is outputted as illustrated in FIG. 8C.

Thus, the rotational difference V inputted into the frequency separating part 221 is divided into the high-frequency component Vhf corresponding to the vibration component higher than the frequency (e.g., 10 to 20 Hz) of the judder vibration, and Vlf corresponding to other low-frequency components of the rotational difference V from which the high-frequency component Vhf is removed.

The low-frequency component Vlf separated by the frequency separating part 221 is inputted into the engagement pushing force calculating part 222, and the high-frequency component Vhf is inputted into the correction pushing force calculating part 223.

A demanded transmission torque Tcl is inputted into the engagement pushing force calculating part 222 in addition to the low-frequency component Vlf. The engagement pushing force calculating part 222 calculates the pushing force P0 according to the demanded transmission torque Tcl.

Figure 8D:
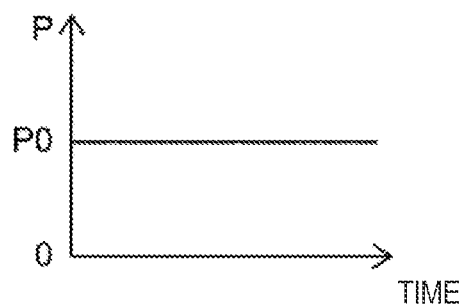
FIG. 8D is a graph of an engagement pushing force at point D.

In detail, the engagement pushing force calculating part 222 first calculates the friction coefficient μ based on the low-frequency component Vlf and the μ-V characteristic formula μr (μr=−rV+s) of each friction engagement element which is a function of the rotational difference provided to the TCM 202 in advance. Then, the pushing force P0 required for the engagement control is calculated based on the frictional force F calculated based on the calculated friction coefficient μ and the demanded transmission torque Tcl, and the relational expression of [frictional force F]= [friction coefficient μ]×[pushing force P]. That is, at point D after the engagement pushing force calculating part 222, the pushing force P0 required for the engagement control is outputted as illustrated in FIG. 8D.

As for the calculation of the pushing force P0, the pushing force P0 according to the demanded transmission torque Tcl may be read from a map of the demanded transmission torque Tcl of each friction engagement element and the pushing force P0 which is provided in advance. Note that since the relationship between the demanded transmission torque Tcl and the pushing force P0 varies according to the rotational difference and the oil temperature, the map depends on the rotational difference and the oil temperature.

Note that, in order to calculate the demanded transmission torque Tcl, the engine torque Te is first calculated based on the engine speed detected by the engine speed sensor 211, the accelerator opening detected by the accelerator opening sensor 210, and the characteristic map using the engine torque, the engine speed, and the accelerator opening as parameters, which is stored in the memory of the TCM 202 in advance. Then, the demanded transmission torque Tcl required for the high clutch 50 is acquired based on the calculated engine torque and the gear ratio of the gear stage calculated at Step S2. Note that the method of acquiring the demanded transmission torque Tcl is not limited to the above, and the target demanded transmission torque Tcl may be determined based on various conditions.

The high-frequency component Vhf and the low-frequency component Vlf are inputted into the correction pushing force calculating part 223. The correction pushing force calculating part 223 calculates the correction pushing force ΔPhf for suppressing the judder vibration. The correction pushing force ΔPhf of the pushing force calculated here is to make the amplitude Δv of the vibration component Vhf into substantially zero as described above.

For the purpose of making the amplitude Δv of the vibration component Vhf into substantially zero, when the rotational difference V of the vibration component Vhf increases from zero, the correction pushing force calculating part 223 calculates the correction pushing force ΔPhf so that the frictional force F is increased to reduce the rotational difference V, and when the rotational difference V of the vibration component Vhf decreases from zero, it calculates the correction pushing force ΔPhf so that the frictional force F is reduced to increase the rotational difference V. In other words, the correction pushing force calculating part 223 calculates the correction pushing force ΔPhf so that the relation of the frictional force F relative to the rotational difference V of the vibration component Vhf (F-V characteristic) becomes the positive slope. The correction pushing force calculating part 223 calculates the correction pushing force ΔPhf based on the vibration component Vhf, the μ-V characteristic formula μr of each friction engagement element provided to the TCM 202 in advance, the μ-V characteristic formula μt of the positive slope used as the target provided to the TCM 202 in advance, and other low-frequency components Vlf.

Below, a concrete method of calculating the correction pushing force ΔPhf is described. First, the μ-V characteristic of each friction engagement element in this embodiment becomes the negative slope (e.g., μr=−rV+s), as illustrated by the solid line in FIG. 6B. By simply multiplying the μ-V characteristic formula μr of the friction coefficient of the negative slope by the pushing force P0, the F-V characteristic formula Fr of the friction engagement element becomes the negative slope (Fr=(−rV+s)×P0), as illustrated by the solid line in FIG. 6A.

As described above, the F-V characteristic formula Fr of each friction engagement element is desirable to be a positive slope. Therefore, for the purpose of making the F-V characteristic for the vibration component Vhf into the positive slope, the correction pushing force calculating part 223 calculates the correction pushing force ΔPhf of the pushing force P0.

In this calculation of the correction pushing force ΔPhf, the F-V characteristic formula Ft of the positive slope to be achieved is illustrated by the broken line in FIG. 6A. Since this F-V characteristic formula Ft is the F-V characteristic formula of the positive slope used as the target to be achieved, it is referred to as the "target F-V characteristic formula Ft." Further, the characteristic formula which is made into the dimension of the friction coefficient μ by dividing the target F-V characteristic formula Ft by the pushing force P0 is illustrated by the broken line in FIG. 6B, and it is referred to as the "target μ-V characteristic formula μt."

Turning the F-V characteristic for the vibration component Vhf into the positive slope is to turn the F-V characteristic formula Fr for the vibration component Vhf into the same characteristic as the target F-V characteristic formula Ft=(tV+u)×P0 of the positive slope illustrated by the broken line in FIG. 6A. Thus, by correcting the pushing force P0 of the F-V characteristic formula Fr by the correction pushing force ΔPhf (i.e., by calculating Fr=(rV+s)×(P0+ΔPhf)), the F-V characteristic formula is corrected to be the same characteristic as the target F-V characteristic formula Ft= (tV+u)×P0 which is the positive slope. In order to calculate ΔPhf for achieving the correction, the correction pushing force ΔPhf at which (−rV+s)×(P0+ΔPhf)=(tV+u)×P0 is established is calculated. That is, the above formula is summarized by ΔPhf to obtain ΔPhf=((tV+u)/(−rV+s)−1)× P0.

Figure 8E:
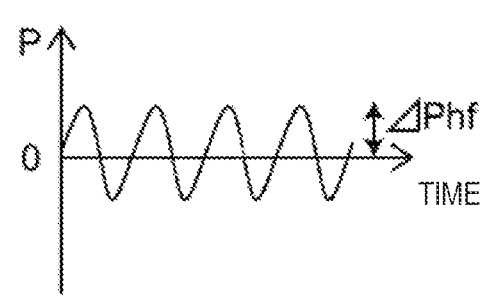
FIG. 8E is a graph of a correction pushing force at point E.

Therefore, by adding the correction pushing force ΔPhf= ((tV+u)/(−rV+s)−1)×P0 to the engagement pushing force P0, the F-V characteristic formula for the vibration component Vhf can be corrected to the same characteristic as the target F-V characteristic formula Ft of the positive slope. Therefore, at point E after the correction pushing force calculating part 223, the correction pushing force ΔPhf for canceling the amplitude Δv of the vibration component Vhf as illustrated in FIG. 8E is outputted.

The engagement pushing force P0 and the correction pushing force ΔPhf are inputted into the totaling part 224. The totaling part 224 adds the correction pushing force ΔPhf to the engagement pushing force P0, and outputs the corrected pushing force P0+ΔPhf. As described above, the pushing force calculating part 220 calculates the pushing force for the pushing force control during the engagement of each friction engagement element.

Next, one example of a control operation of the pushing force control executed by the TCM 202 is described with reference to a flowchart illustrated in FIG. 10. Note that, here, a gear change from the third gear to the fourth gear is described as an example.

Figure 9:
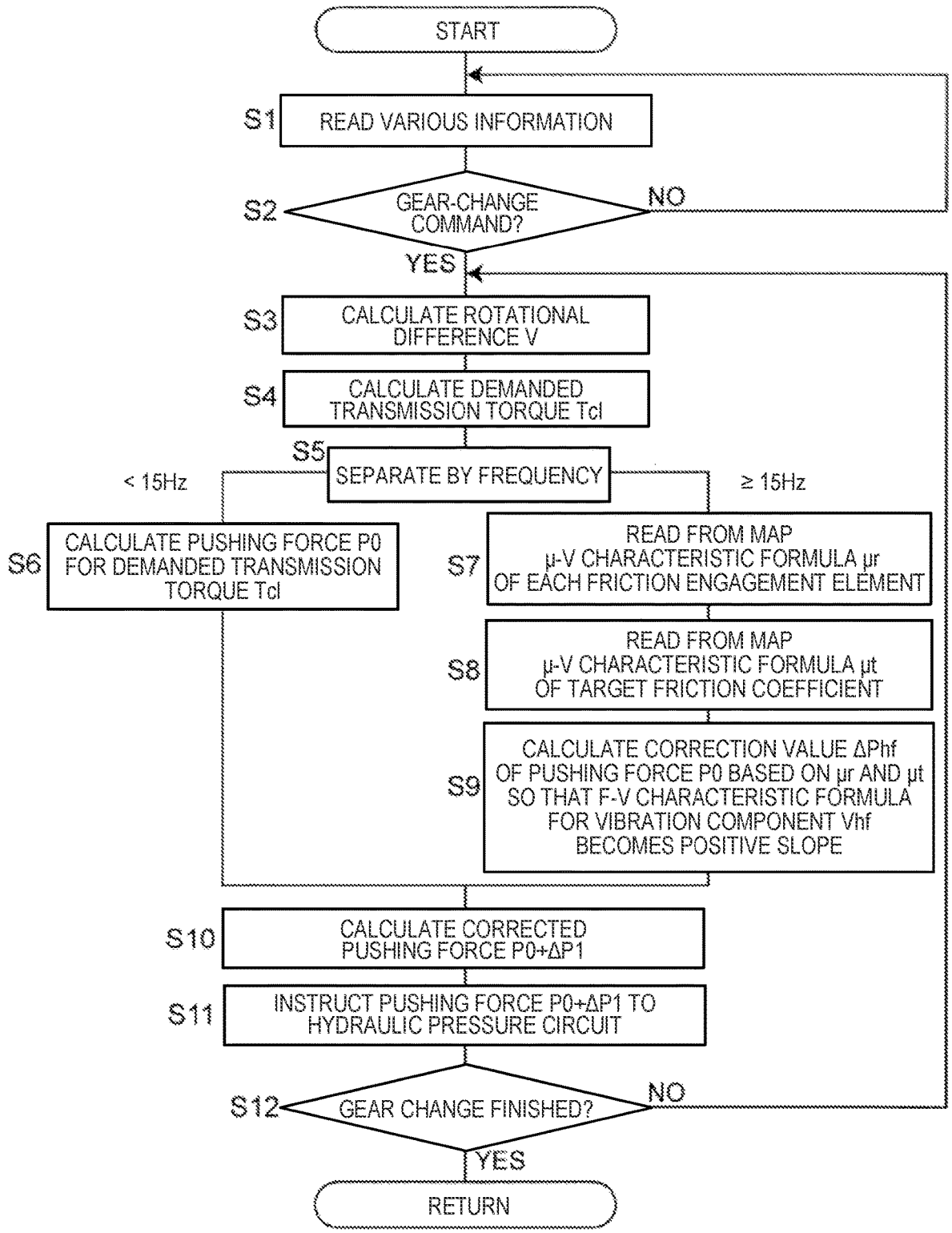
FIG. 9 is a flowchart illustrating a flow of a transmission control operation of the friction engagement element control system.

The control operation illustrated in FIG. 9 is constantly repeated while the transmission control is performed for the vehicle traveling forward.

First, the TCM 202 reads the variety of information at Step S1. At Step S2, the TCM 202 determines whether there is a gear-change command based on the read information. The existence of the gear-change command is determined according to whether the vehicle speed detected by the vehicle speed sensor 212 and the accelerator opening detected by the accelerator opening sensor 210 satisfy the gear-change condition based on the transmission chart stored in a memory of the TCM 202 in advance. At Step S2, if the TCM 202 determines that there is no gear-change command, it returns the flow to Step S1.

If there is the gear-change command at Step S2, the TCM 202 shifts the flow to Step S3, where it detects the rotational difference V In detail, the TCM 202 calculates the rotational difference V of the high clutch 50 which is engaged during the 3rd-to-4th gear change based on the rotating speed of the input shaft 2 detected by the input-shaft rotating speed sensor 214, the output shaft rotating speed detected by the vehicle speed sensor 212, and a gear ratio of the automatic transmission 1 which is known in advance. Note that, although in this embodiment the rotational difference V is calculated based on the signals from the input-shaft rotating speed sensor 214 and the vehicle speed sensor 212 as a rotational difference sensor, the rotational difference sensor is not limited to the above, and it may directly detect the rotational difference between the input member and the output member.

At the next Step S4, the TCM 202 calculates the demanded transmission torque Tcl. In order to calculate the demanded transmission torque Tcl, an engine torque Te is first calculated based on the engine speed detected by the engine speed sensor 211, the accelerator opening detected by the accelerator opening sensor 210, and an engine characteristic map stored in the memory of the TCM 202 in advance, which uses the engine torque, the engine speed, and the accelerator opening as parameters. Then, the demanded transmission torque Tcl required for the high clutch 50 is acquired from the calculated engine torque Te and a gear ratio of the gear stage calculated at Step S2. Note that the method of acquiring the demanded transmission torque Tcl is not limited to the above, and the target demanded transmission torque Tcl may be determined based on various conditions.

At Step S5, the high-pass filter 221a divides the variation in the rotational difference calculated at Step S3 by the frequency. The variation in the rotational difference is divided into the rotational difference (high-frequency component) Vhf at the high frequency (e.g., 15 Hz or higher) corresponding to the vibration component, and other low-frequency components Vlf.

At the next Step S6, the pushing force P0 according to the demanded transmission torque Tcl is calculated based on other low-frequency components Vlf separated at Step S5, and the demanded transmission torque Tcl acquired at Step S4. In detail, the friction coefficient μ is first calculated based on the low-frequency component Vlf and the μ-V characteristic formula μr (μr=−rV+s) of each friction engagement element which is the function of the rotational difference provided to the TCM 202 in advance. Then, the pushing force P0 required for the engagement control is calculated based on the calculated friction coefficient μ, the frictional force F calculated based on the demanded transmission torque Tcl, and the relational expression of [frictional force F]=[friction coefficient μ]×[pushing force P].

Note that instead of calculating the pushing force P0, the pushing force P0 according to the demanded transmission torque Tcl may be read from the map of the demanded transmission torque Tcl of the high clutch 50 and the pushing force P0 which is provided to the TCM 202 in advance. Note that since the relationship between the demanded transmission torque Tcl and the pushing force P0 varies according to the rotational difference and the oil temperature, the map depends on the rotational difference and the oil temperature.

Since the μ-V characteristic formula μr of the high clutch 50 is the negative slope (see the solid line in FIG. 6B), when the high clutch 50 is engaged with the pushing force P0 according to the demanded transmission torque Tcl calculated at Step S6, the judder vibration may occur.

Figure 6B:
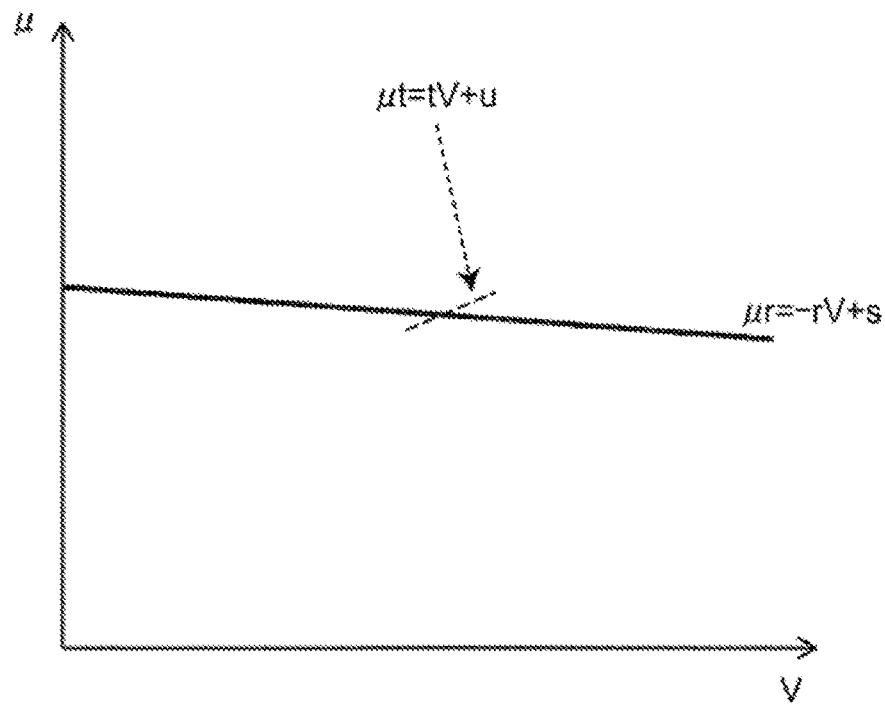

Here, the μ-V characteristic of the high clutch 50 becomes the negative slope, as illustrated by the solid line in FIG. 6B (e.g., μr=−rV+s). By simply multiplying the μ-V characteristic formula μr of the friction coefficient of the negative slope by the pushing force P0, the F-V characteristic formula Fr of each friction engagement element becomes the negative slope as illustrated by the solid line in FIG. 6A (Fr=(−rV+s)×P0).

As described above, the F-V characteristic for the vibration component Vhf is desirable to be the positive slope. At Steps S7-S9, the correction pushing force ΔPhf of the pushing force P0 for turning the F-V characteristic for the vibration component Vhf into the positive slope is calculated.

In the calculation of the correction pushing force ΔPhf, the F-V characteristic formula Ft of the positive slope to be achieved is illustrated by the broken line in FIG. 6A. Since this F-V characteristic formula Ft is the F-V characteristic formula of the positive slope used as the target to be achieved, it is referred to as the "target F-V characteristic formula Ft." Further, the characteristic formula which is made into the dimension of the friction coefficient μ by dividing the target F-V characteristic formula Ft by the pushing force P0 is illustrated by the broken line in FIG. 6B, and it is referred to as the "target μ-V characteristic formula μt." The concrete methods of calculating the correction pushing force ΔPhf of the pushing force P0 and correcting by ΔPhf will be described later.

At Step S7, the μ-V characteristic formula μr of the friction coefficient μ relative to the rotational difference V of the high clutch 50 which transitions from the disengaged state to the engaged state in the third-to-fourth gear change is read. The μ-V characteristic formula μr of the friction coefficient of the high clutch 50 has the μ-V characteristic of the negative slope in which the friction coefficient μ decreases as the rotational difference V increases, for example, as illustrated by the solid line in FIG. 6B. The μ-V characteristic formula μr of the high clutch 50 read at Step S7 may be, for example, a linear expression relevant to the rotational difference V ($\mu r=-rV+s$) (here, r and s are constants).

At Step 8, the target $\mu$-V characteristic formula $\mu t$ of the friction coefficient provided to the TCM 202 in advance is read. The target $\mu$-V characteristic formula $\mu t$ of the friction coefficient has the $\mu$-V characteristic of the positive slope in which the friction coefficient $\mu$ increases as the rotational difference V increases, for example, as illustrated by the broken line in FIG. 6B. The target $\mu$-V characteristic formula $\mu t$ of the friction coefficient read at Step S7 may be, for example, a linear expression relevant to the rotational difference V ($\mu t=tV+u$) (here, t and u are constants).

At Step S9, the correction pushing force $\Delta Phf$ of the pushing force P0 calculated at Step S6 is calculated based on the $\mu$-V characteristic formula $\mu r$ of the friction coefficient of the high clutch 50 read at Step S7 and the target $\mu$-V characteristic formula $\mu t$ of the friction coefficient.

Here, one example of the method of calculating the correction pushing force $\Delta Phf$ of the pushing force P0 is described. As described above, in order to suppress the judder vibration, the characteristic formula of the frictional force F corresponding to the vibration component Vhf relative to the rotational difference V is desirable to be the positive slope in which the frictional force F decreases as the rotational difference V decreases, as illustrated by the broken line in FIG. 6B.

Therefore, the purpose for correcting the pushing force P0 by the correction pushing force $\Delta Phf$ is to make the F-V characteristic formula for the vibration component Vhf into the same characteristic as the target F-V characteristic formula $Ft=(tV+u)\times P0$ of the positive slope illustrated by the broken line in FIG. 6A. However, when simply multiplying the $\mu$-V characteristic formula $\mu r$ of the negative slope of the friction coefficient of the high clutch 50 illustrated by the solid line in FIG. 6B by the pushing force P0, it becomes the F-V characteristic formula $Fr=(rV+s)\times P0$ of the negative slope as illustrated by the solid line in FIG. 6A. Therefore, by correcting the pushing force P0 of the F-V characteristic formula Fr by the correction pushing force $\Delta Phf$ (i.e., by calculating $Fr=(rV+s)\times(P0+\Delta Phf)$), the F-V characteristic formula is corrected to be the same characteristic as the target F-V characteristic formula $Ft=(tV+u)\times P0$ which is the positive slope. In order to calculate the correction pushing force $\Delta Phf$ for achieving this correction, $\Delta Phf$ at which $(-rV+s)\times(P0+\Delta Phf)=(tV+u)\times P0$ is established is calculated. That is, the above formula is summarized by $\Delta Phf$ to calculate $\Delta Phf=((tV+u)/(-rV+s)-1)\times P0$.

Therefore, by adding the correction pushing force $\Delta Phf=((tV+u)/(-rV+s)-1)\times P0$ to the Fr pushing force P0, the F-V characteristic formula for the vibration component Vhf can be corrected to the same characteristic as the target F-V characteristic formula Ft of the positive slope.

At the next Step S10, the corrected pushing force $P0+\Delta Phf$ is calculated by adding the correction pushing force $\Delta Phf$ of the pushing force for the judder vibration control to the pushing force P0 for the engagement control calculated at Step S6.

At Step S11, an instruction is outputted so that the corrected pushing force $P0+\Delta Phf$ calculated at Step S10 is supplied to the high clutch 50.

At Step S12, the TCM 202 determines whether the gear change is finished. At Step S12, if the gear change is finished, the TCM 202 ends this flow. At Step S12, if the gear change is not finished, the TCM 202 returns the flow to Step S3 to repeat the pushing force control. Note that the determination at Step S12 may be based on whether the rotational difference V equals to zero (i.e., V=0).

Although in the above flowchart the high clutch 50 which transitions from the disengaged state to the engaged state in the third-to-fourth gear change is described, a similar control is performed for the friction engagement element which transitions from the disengaged state to the engaged state in other gear-change situations, as needed.

According to the above configuration, by using the friction plates with the high friction coefficient having the $\mu$-V characteristic of the negative slope in which the friction coefficient $\mu$ decreases as the rotational difference V increases, the pushing force P of each of the friction engagement elements 40, 50, 60, 70, and 80 can be reduced. Therefore, the drive energy for driving the pushing force generation means can be reduced, thereby improving fuel efficiency and downsizing the drive sources (the engine, the motor, etc.).

Since the control device 200 (controller) controls the pushing force of the friction engagement element so as to have the positive-slope characteristic in which the frictional force F decreases as the rotational difference of the friction engagement element decreases when engaging the friction engagement element, judder vibration can be suppressed even when the friction material of which the $\mu$-V characteristic of the friction coefficient is the negative slope is used.

As described above, in the friction engagement element control system, both the improvement in fuel efficiency by the reduction of the pushing force of the friction engagement element and the reduction of judder vibration can be achieved.

Moreover, particularly according to the present disclosure, since the pushing force control is performed so that the characteristic becomes the positive slope in which the frictional force F decreases as the rotational difference V of the vibration component Vhf among the variations of the rotational difference of each of the friction engagement elements 40, 50, 60, 70, and 80 decreases, the control range of the pushing force P can be reduced. In detail, during the engagement, the control range of the pushing force P can be reduced, as compared with the case where the pushing force P is controlled so that it becomes the F-V characteristic of the positive slope in which the frictional force F decreases as the rotational difference V of each friction engagement element decreases. Therefore, the controllability when engaging each of the friction engagement elements 40, 50, 60, 70, and 80 improves. Moreover, since the pushing force P at the high rotational difference side where the rotational difference V is large can be reduced, fuel efficiency can be improved.

Moreover, as described above, since the actuation system has the configuration of the friction engagement element provided with the control valve which controls the hydraulic pressure supplied to the piston from the oil pump, both the improvement in fuel efficiency by the reduction of the pushing force of the friction engagement element and the reduction of judder vibration can be achieved, without changing the configuration of the friction engagement element of a conventional automatic transmission.

Moreover, as described above, the rotational difference V of the friction engagement element 50 is calculated based on the rotating speeds of the input shaft 2 as the input member of the automatic transmission 1 and the output member 4 of the automatic transmission 1, and the gear ratio of the friction engagement element 50. Therefore, it is not necessary, for obtaining the rotational difference V, to be provided with a sensor for detecting a rotating speed of each of the inner friction plates 52, and the outer friction plates 54 of each friction engagement element 50 (or the inner and outer rotating members 51 and 53 with which both the friction plates engage).

Moreover, as described above, since the control device (controller) 200 corrects the pushing force for controlling the engaging force (frictional force) F according to the rotational difference V, it can control the engaging force (frictional force) F relative to the rotational difference V so as to become the positive slope.

Moreover, as described above, since the control device (controller) 200 performs the control during a period from the engagement start of the friction engagement element 50 to the completion of engagement, the judder vibration during the transition from the disengaged state to the engaged state can be suppressed effectively.

Moreover, as described above, the frequency separating part 221 can divide, with the simple configuration using the filter, such as the high-pass filter 221a or a low-pass filter, into the vibration component Vhf and other low-frequency components (the frequency component including the variation in the rotational difference from disengagement to engagement of the friction engagement element during a gear change when there is no judder vibration).

Figure 10A:
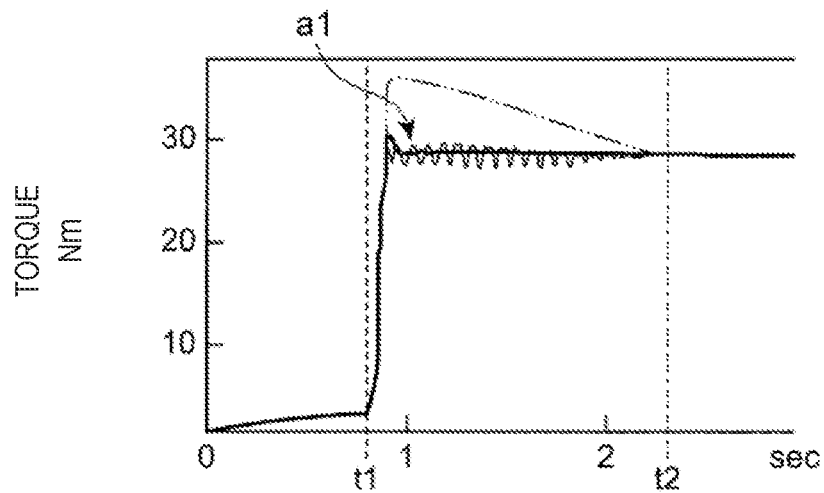
FIGS. 10A to 10C illustrate a simulation result of a transmission control operation of the friction engagement element control system.
Figure 10B:
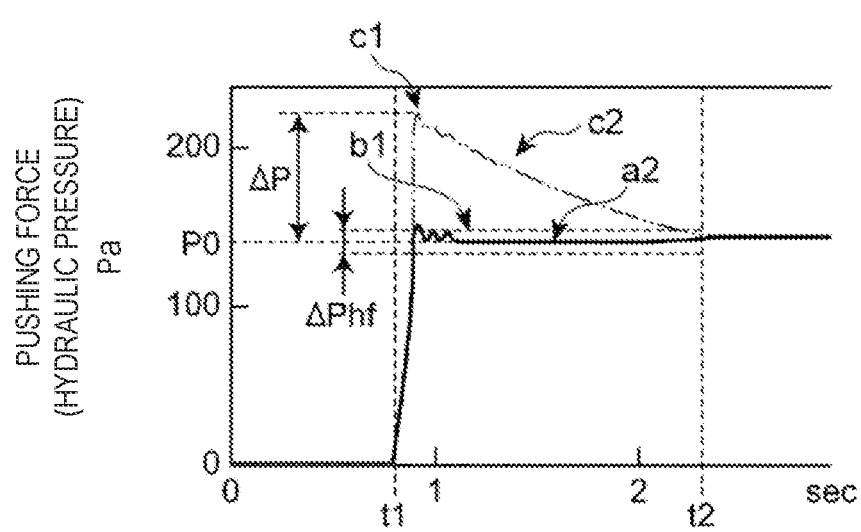
Figure 10C:
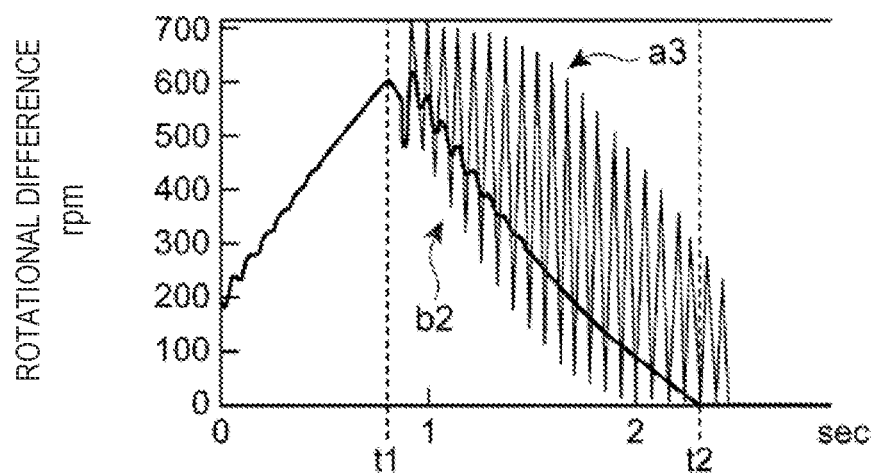

As illustrated in FIGS. 10A to 10C, according to the pushing force control by the above configuration, it is confirmed by computer simulation that the judder vibration during the engagement of the friction engagement element having the μ-V characteristic of the negative slope is suppressed.

FIGS. 10A to 10C illustrate a case where the friction engagement element having the μ-V characteristic of the negative slope transitions from the disengaged state to the engaged state, where FIG. 10A illustrates a temporal change in the torque of the friction engagement element, FIG. 10B illustrates a temporal change in the pushing force of the friction engagement element, and FIG. 10C illustrates a temporal change in the rotational difference of the friction engagement element. In FIGS. 10A to 10C, the thin line indicates a simulation result when the pushing force control is not carried out and the thick line indicates a simulation result when the pushing force control is carried out.

When not carrying out the pushing force control, the pushing force P is raised to a given value according to the demanded transmission torque (an arrow a1) at a gear-change command timing (engagement start timing) t1 and is then controlled at a constant value (an arrow a2). In this case, while transitioning from the engagement start timing t1 to an engagement completion timing t2, the judder vibration occurs (an arrow a3).

On the other hand, when the pushing force control is carried out, as illustrated by an arrow b1, at the gear-change command timing t1, the pushing force control is performed for every cycle (the arrow b1) so that the vibration component Vhf of the pushing force P becomes zero by the corrected pushing force P0+ΔPhf obtained by adding the given value P0 according to the demanded transmission torque (the arrow a1) to the correction pushing force ΔPhf. Therefore, as illustrated in FIG. 10C, the judder vibration which occurs while transiting from the engagement start timing t1 to the engagement completion timing t2 is suppressed (an arrow b2).

Figure 5B:
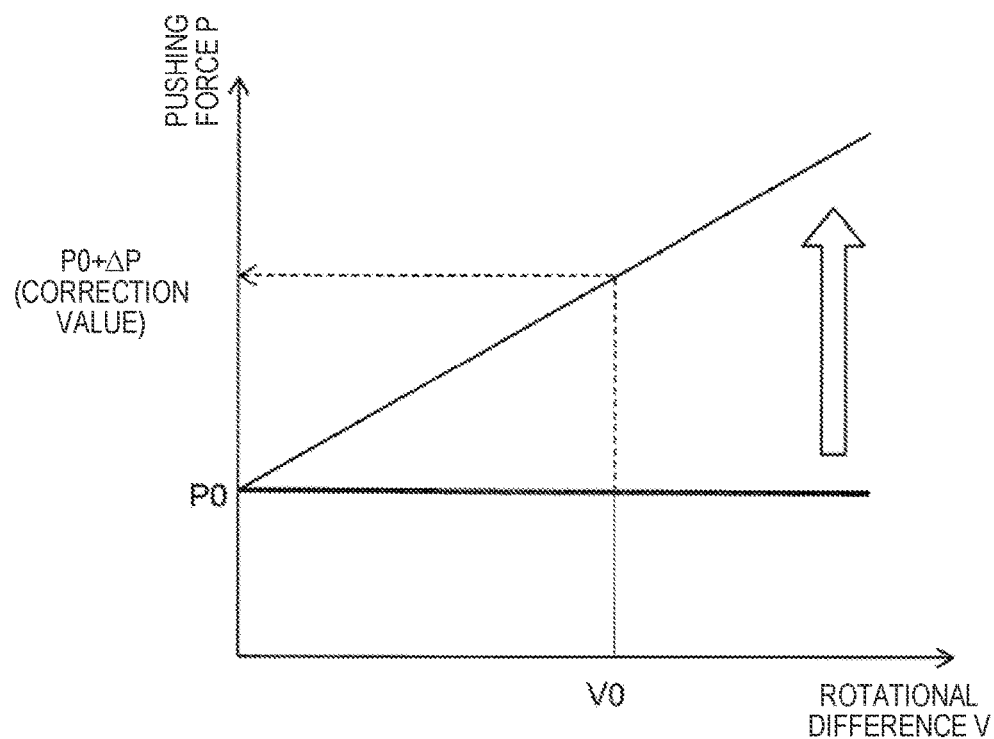

FIGS. 10A and 10B illustrate, by imaginary lines, temporal changes in the torque and the pushing force when the correction is performed to turn the F-V characteristic illustrated in FIGS. 5A and 5B into the positive slope as a whole. As illustrated by an arrow c1, at the gear-change command timing t1, the pushing force control is performed for every cycle so that the pushing force P is raised to the corrected pushing force P0+ΔP obtained by adding the correction value ΔP to the given value P0 according to the demanded torque (the arrow a1), and the correction value ΔP of the pushing force is reduced as the rotational difference V decreases (the arrow c2). Therefore, the judder vibration which occurs while transiting from the engagement start timing t1 to the engagement completion timing t2 is suppressed.

Comparing the correction value ΔP with the correction pushing force ΔPhf of the present disclosure, the pushing force P is controlled within a very small control range so that the correction pushing force ΔPhf of the present disclosure become substantially in agreement with the given value P0 according to the demanded transmission torque Tcl. Therefore, the judder vibration is suppressed without sacrificing the controllability. Moreover, since it is not necessary to unnecessarily raise the pushing force at the high rotational difference side where the rotational difference is large, the improvement in fuel efficiency by using the friction engagement element having the high friction coefficient is achieved more effectively.

Note that although in this simulation 600 rpm which is a typical rotational difference at a gear change by one gear stage is used as one example of the initial value, the judder vibration can also be suppressed by a similar pushing force control at other speeds.

The present disclosure is not limited to the illustrated embodiment, and various improvements and design alterations are possible without departing from the spirit of the present disclosure.

Figure 11:
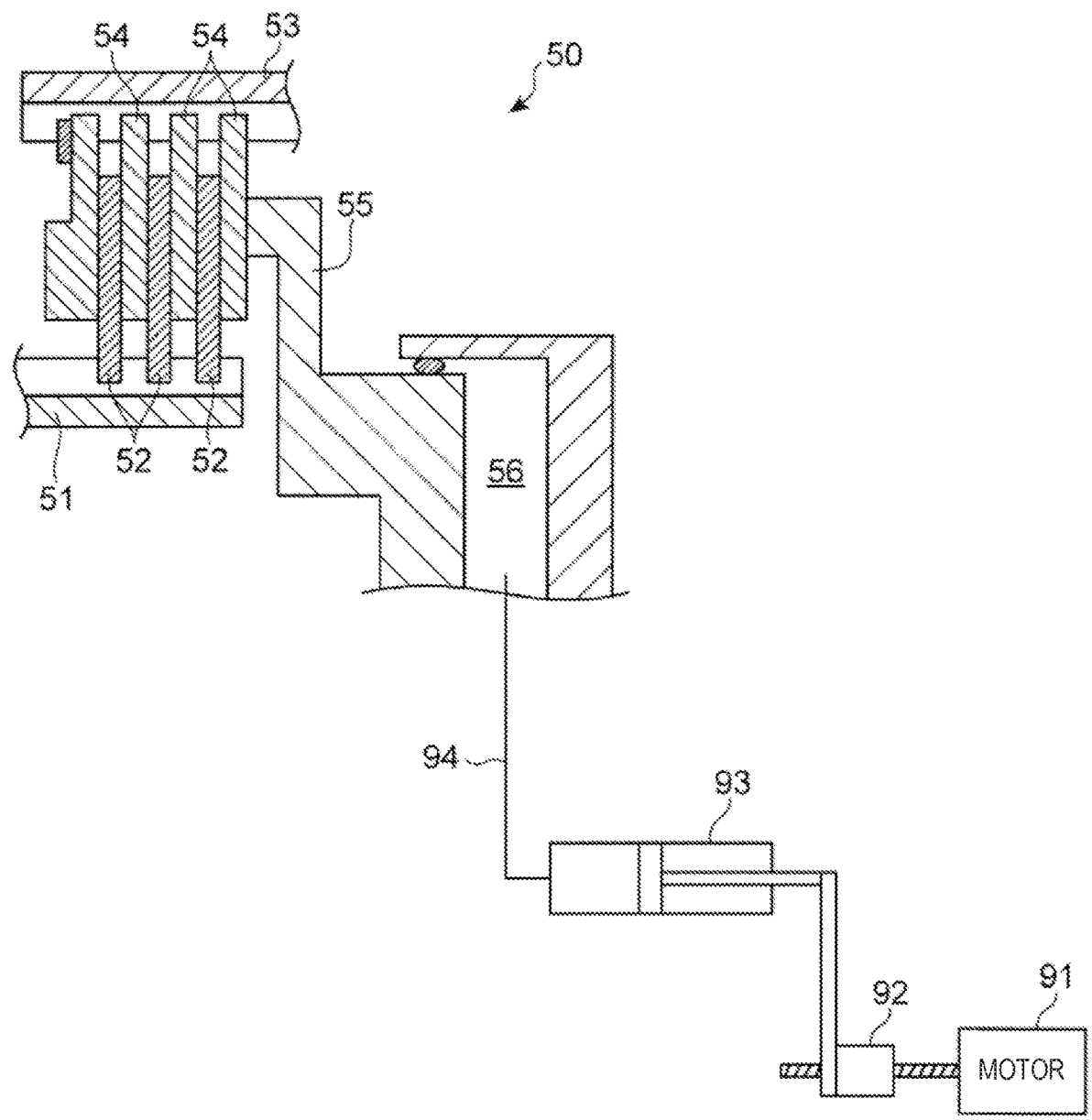
FIG. 11 is a view illustrating a modification of an actuation system.
Figure 12:
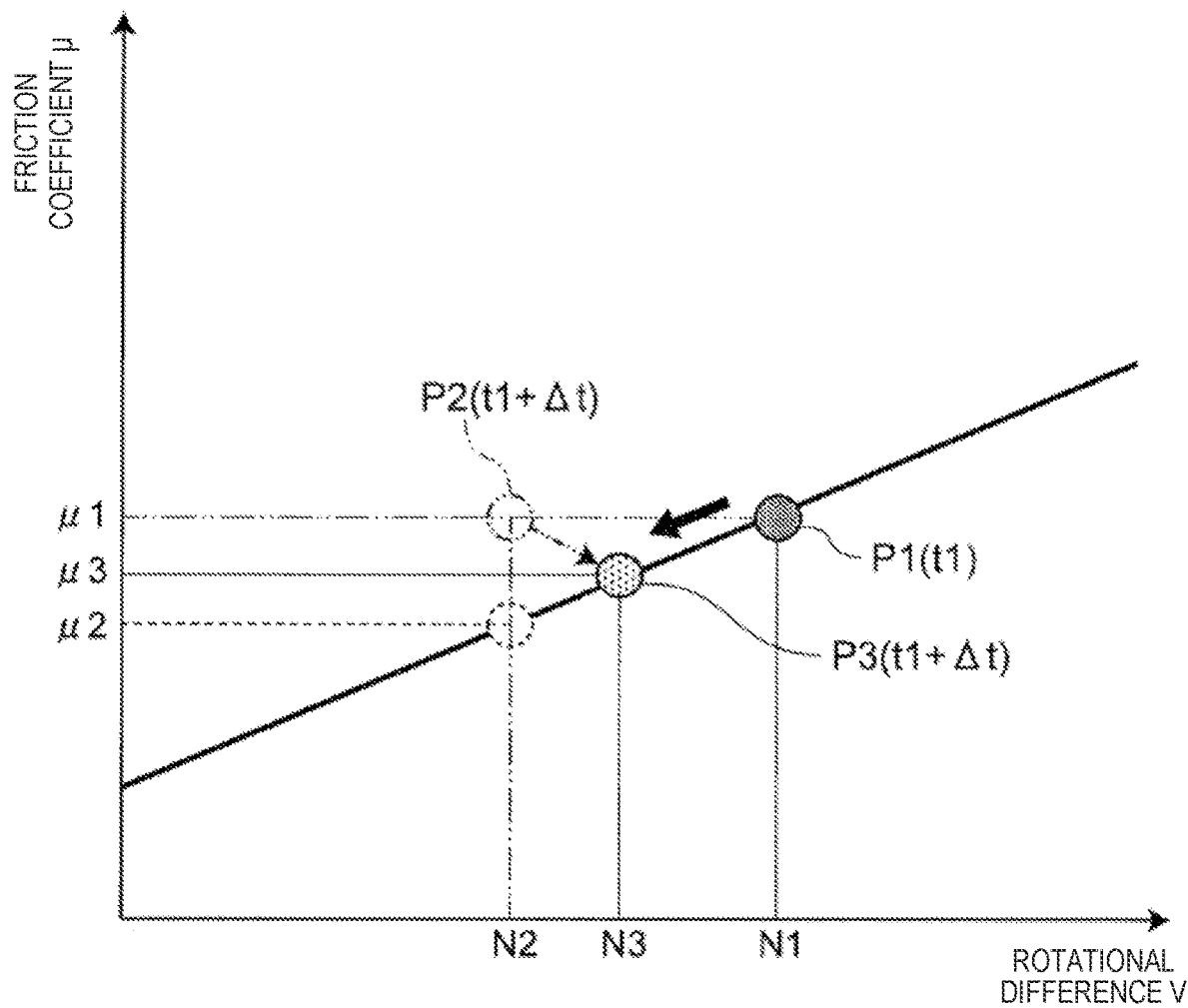
FIG. 12 is a graph of a change in the friction engagement element relative to the rotational difference when the friction engagement element of which the μ-V characteristic is a positive slope is engaged.

For example, although the actuation system is provided with the piston 55, the oil pump 62, and the solenoid valve 101 which controls the hydraulic pressure supplied from the oil pump 62 to the piston 55, it may be a so-called "electrohydraulic clutch actuator" in which the piston 55 and a hydraulic cylinder 93 which supplies the hydraulic pressure to the piston 55 are operated by an electric motor 91, as illustrated in FIG. 11.

In detail, the electrohydraulic clutch actuator type piston includes the piston 55, the motor 91, a converter 92 which converts a rotational motion of the motor 91 into a linear motion, the hydraulic cylinder 93, and an oil passage 94 which connects the hydraulic cylinder 93 with the hydraulic pressure chamber 56 of the friction engagement element 50.

The electrohydraulic clutch actuator type piston drives the motor 91 to linearly move the converter 92 and the piston 95 of the hydraulic cylinder 93 connected to the converter 92. Therefore, the hydraulic fluid of the hydraulic cylinder 93 is supplied to the hydraulic pressure chamber 56 of the friction engagement element via the oil passage 94, and the piston 55 presses the friction plates 52 and 54.

According to the above configuration, for example, the speed of response of the friction engagement element can be improved as compared with the case where the oil is supplied from the oil pan by the oil pump. For example, since the frequency of the judder vibration is about 10 Hz to about 20 Hz (see the arrow a3 in FIG. 10C), by setting the speed of response as 100 Hz or higher, the pushing force control can be performed at a sufficiently higher speed of response than the frequency of the judder vibration. Therefore, the judder vibration may be suppressed more effectively.

Note that the speed of response may be a period of time after the actuation system receives a given hydraulic pressure supply command from the controller until the hydraulic pressure is controlled to reach the given value and the piston presses the friction plates.

Moreover, although in this embodiment the correction pushing force calculating part 223 calculates the correction pushing force ΔPhf while the target F-V characteristic formula Ft and each of the μ-V characteristic formulas μr and μt are considered to be linear formulas, the method of calculating the correction pushing force ΔPhf is not limited to this configuration. For example, the correction pushing force ΔPhf calculated by the correction pushing force calculating part 223 may use a calculation method which turns the negative slope of the μ-V characteristic into the positive slope of the F-V characteristic by the pushing force control. For example, each of the μ-V characteristic formulas and the F-V characteristic formulas may be a linear, quadratic, or logarithm expression, or may be read from a map provided in advance.

Moreover, although the control device for the friction engagement element is mounted on the automatic transmission, the friction engagement element may be an electromagnetic clutch used for 4WD and provided with an electromagnetic actuation system.

As described above, according to the present disclosure, since both the improvement in fuel efficiency by the reduction of the pushing force of the friction engagement element and the reduction of judder vibration can be achieved in the control device for the friction engagement element, it may be suitably utilized in the manufacturing industry field of the friction engagement elements.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
2 Input Shaft (Input Member of Automatic Transmission)
4 Output Gear (Output Member of Automatic Transmission)
50 Friction Engagement Element
52 Inner Friction Plate Output-side Friction Plate
54 Outer Friction Plate Input-side Friction Plate
55 Piston
62 Oil Pump
91 Electric Motor
93 Hydraulic Cylinder
101 Solenoid Valve (Control Valve)
200 Control Device (Controller)
212 Vehicle Speed Sensor (Output Rotating Speed Sensor)
214 Input-Shaft Rotating Speed Sensor (Input Rotating Speed Sensor)
221 Frequency Separating Part
221a Filter

What is claimed is:

1. A friction engagement element control system, comprising:
a friction engagement element including friction plates, which are an input-side friction plate, an output-side friction plate, and an actuation system configured to engage the input-side friction plate with the output-side friction plate with a pushing force, the friction plates having a negative slope characteristic in which a friction coefficient thereof decreases as a rotational difference between the friction plates increases;
a rotational difference sensor configured to detect the rotational difference of the friction engagement element;
a filter configured to divide a variation in the rotational difference detected by the rotational difference sensor into a high-frequency component that is a vibration component and other low-frequency components; and
a controller configured to control the pushing force of the friction engagement element only for the vibration component of the rotational difference so that the negative slope characteristic becomes a positive slope characteristic in which a frictional force of the friction engagement element decreases as the rotational difference decreases, when engaging the friction engagement element.

2. The friction engagement element control system of claim 1, wherein the actuation system includes a piston, an oil pump, and a control valve configured to control hydraulic pressure supplied to the piston from the oil pump.

3. The friction engagement element control system of claim 2, wherein the friction engagement element control system constitutes an automatic transmission,
wherein the automatic transmission includes an input member coupled to the input-side friction plate, an output member coupled to the output-side friction plate, an input rotating speed sensor configured to detect a rotating speed of the input member, and an output rotating speed sensor configured to detect a rotating speed of the output member, and
wherein the controller calculates the rotational difference by converting the input rotating speed detected by the input rotating speed sensor and the output rotating speed detected by the output rotating speed sensor.

4. The friction engagement element control system of claim 3, wherein the controller corrects the pushing force according to the rotational difference.

5. The friction engagement element control system of claim 4, wherein the controller controls the pushing force from a start of the engagement of the friction engagement element to an end of the engagement.

6. The friction engagement element control system of claim 5, wherein the filter separates the high-frequency component from the other low-frequency components according to a frequency of the variation in the rotational difference.

7. The friction engagement element control system of claim 2, wherein the actuation system includes a piston, a hydraulic cylinder configured to supply hydraulic pressure to the piston, and an electric motor configured to operate the hydraulic cylinder.

8. The friction engagement element control system of claim 7, wherein the friction engagement element control system constitutes an automatic transmission,
wherein the automatic transmission includes an input member coupled to the input-side friction plate, an output member coupled to the output-side friction plate, an input rotating speed sensor configured to detect a rotating speed of the input member, and an output rotating speed sensor configured to detect a rotating speed of the output member, and
wherein the controller calculates the rotational difference by converting the input rotating speed detected by the input rotating speed sensor and the output rotating speed detected by the output rotating speed sensor.

9. The friction engagement element control system of claim 8, wherein the controller corrects the pushing force according to the rotational difference.

10. The friction engagement element control system of claim 9, wherein the controller controls the pushing force from a start of the engagement of the friction engagement element to an end of the engagement.

11. The friction engagement element control system of claim 10, wherein the filter separates the high-frequency component from other low-frequency components according to a frequency of the variation in the rotational difference.

12. The friction engagement element control system of claim 1, wherein the actuation system includes a piston, a hydraulic cylinder configured to supply hydraulic pressure to the piston, and an electric motor configured to operate the hydraulic cylinder.

13. The friction engagement element control system of claim 1, wherein the friction engagement element control system constitutes an automatic transmission,
wherein the automatic transmission includes an input member coupled to the input-side friction plate, an output member coupled to the output-side friction plate, an input rotating speed sensor configured to detect a rotating speed of the input member, and an output rotating speed sensor configured to detect a rotating speed of the output member, and
wherein the controller calculates the rotational difference by converting the input rotating speed detected by the input rotating speed sensor and the output rotating speed detected by the output rotating speed sensor.

14. The friction engagement element control system of claim 1, wherein the controller corrects the pushing force according to the rotational difference.

15. The friction engagement element control system of claim 1, wherein the controller controls the pushing force from a start of the engagement of the friction engagement element to an end of the engagement.

16. The friction engagement element control system of claim 1, wherein the filter separates the high-frequency component from other low-frequency components according to a frequency of the variation in the rotational difference.

17. A method of controlling a friction engagement element including friction plates, which are an input-side friction plate and an output-side friction plate, and an actuation system configured to engage the input-side friction plate with the output-side friction plate with a pushing force, the friction plates having a negative slope characteristic in which a friction coefficient thereof decreases as a rotational difference between the friction plates increases, the method comprising:
detecting the rotational difference of the friction engagement element;
dividing a variation in the detected rotational difference into a high-frequency component that is a vibration component and other low-frequency components; and
controlling the pushing force of the friction engagement element only for the vibration component of the rotational difference so that the negative slope characteristic becomes a positive slope characteristic in which a frictional force of the friction engagement element decreases as the rotational difference decreases, when engaging the friction engagement element.

* * * * *